US009658772B2

(12) United States Patent
Irie

(10) Patent No.: US 9,658,772 B2
(45) Date of Patent: May 23, 2017

(54) MOBILE TERMINAL, RECORDING MEDIUM, AND DATA STORING METHOD

(71) Applicant: KYOCERA Corporation, Kyoto (JP)

(72) Inventor: Kakeru Irie, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 61 days.

(21) Appl. No.: 14/491,926

(22) Filed: Sep. 19, 2014

(65) Prior Publication Data

US 2015/0012870 A1    Jan. 8, 2015

Related U.S. Application Data

(63) Continuation of application No. 12/921,486, filed as application No. PCT/JP2009/054990 on Mar. 10, 2009, now abandoned.

(30) Foreign Application Priority Data

Mar. 12, 2008 (JP) ................. 2008-063031

(51) Int. Cl.
*G06F 3/02* (2006.01)
*G09G 5/00* (2006.01)
(Continued)

(52) U.S. Cl.
CPC ........ *G06F 3/04886* (2013.01); *G06F 3/0481* (2013.01); *G06F 3/0486* (2013.01);
(Continued)

(58) Field of Classification Search
CPC .. G06F 3/04886; G06F 3/04883; G06F 3/018; G06F 3/0486; G06F 3/0488
See application file for complete search history.

(56) References Cited

U.S. PATENT DOCUMENTS 6,009,469 A * 12/1999 Mattaway et al. ............ 709/227
2001/0024212 A1* 9/2001 Ohnishi ........................ 345/769
(Continued)

FOREIGN PATENT DOCUMENTS

JP     09-064959 A    3/1997
JP     10-133725 A    5/1998
(Continued)

OTHER PUBLICATIONS

AU by KDDI, COMA 1X WIN, "W21SA Basic Manual", p. 252, Aug. 2004.
(Continued)

*Primary Examiner* — Alexander Eisen
*Assistant Examiner* — Nan-Ying Yang
(74) *Attorney, Agent, or Firm* — Procopio Cory Hargreaves and Savitch LLP

(57) ABSTRACT

When a touch start is designated within display coordinates of a selected character string, and a touch end is designated within display coordinates of an arbitrary character input key, a mobile terminal temporarily stores the selected character string in a memory area indicated by a memory address corresponding to the arbitrary character input key. Then, when a touch start is designated within the display coordinates of the character input key utilized for temporarily storing the character string, and a touch end is designated within display coordinates of a text of a reply mail, the character string temporarily stored is inserted on the basis of the coordinates indicated by the touch end.

17 Claims, 24 Drawing Sheets

(51) Int. Cl.
G06F 3/041 (2006.01)
G06F 3/045 (2006.01)
G06F 3/0488 (2013.01)
G06F 3/0486 (2013.01)
H04M 1/725 (2006.01)
G06F 3/0481 (2013.01)
G06F 3/0484 (2013.01)

(52) U.S. Cl.
CPC ...... *G06F 3/04842* (2013.01); *G06F 3/04883* (2013.01); *H04M 1/72552* (2013.01); *H04M 2250/22* (2013.01); *H04M 2250/70* (2013.01)

(56) References Cited

U.S. PATENT DOCUMENTS

2006/0139337 A1* 6/2006 Fukao ............................ 345/173
2007/0146346 A1* 6/2007 Sata et al. ..................... 345/173
2009/0124239 A1* 5/2009 Tsuei ................. H04M 1/2745
                                                                455/414.1

FOREIGN PATENT DOCUMENTS

| JP | 2001-142827 A | 5/2001 |
| JP | 2002-354085 A | 12/2002 |
| JP | 2005-209212 A | 8/2005 |
| JP | 2006-171936 A | 6/2006 |
| JP | 2007-316732 A | 6/2007 |
| JP | 2007-280153 A | 10/2007 |

OTHER PUBLICATIONS

Office Action dated Nov. 29, 2011, issued in counterpart Korean Application No. 10-2010-7020232.
Notice of Grounds for Rejection dated May 16, 2011 issued by the Japanese Patent Office for counterpart Japanese Application No. JP2008-063131.

* cited by examiner

FIG. 9
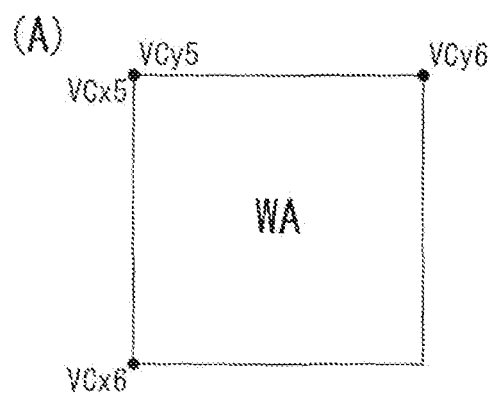
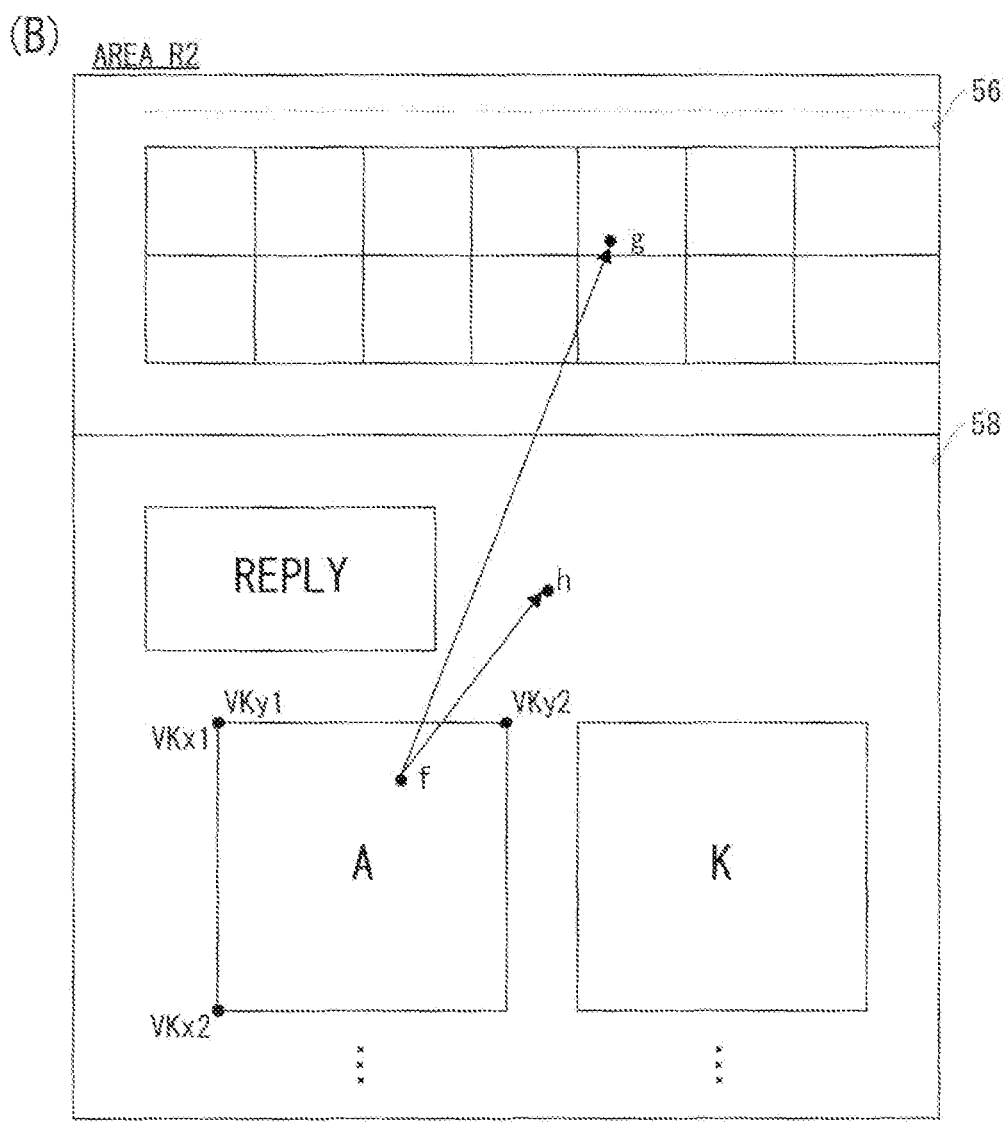

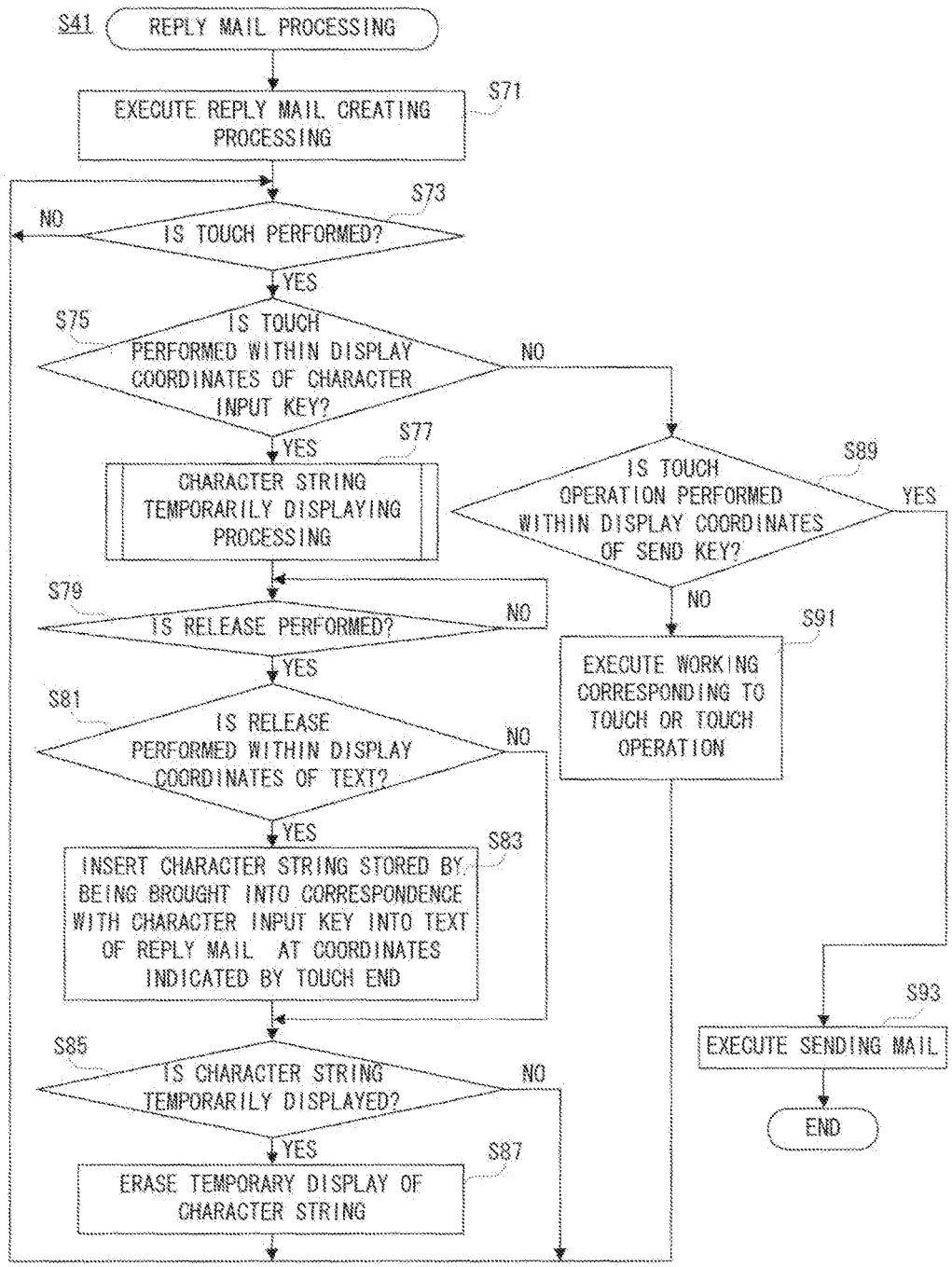

FIG. 18
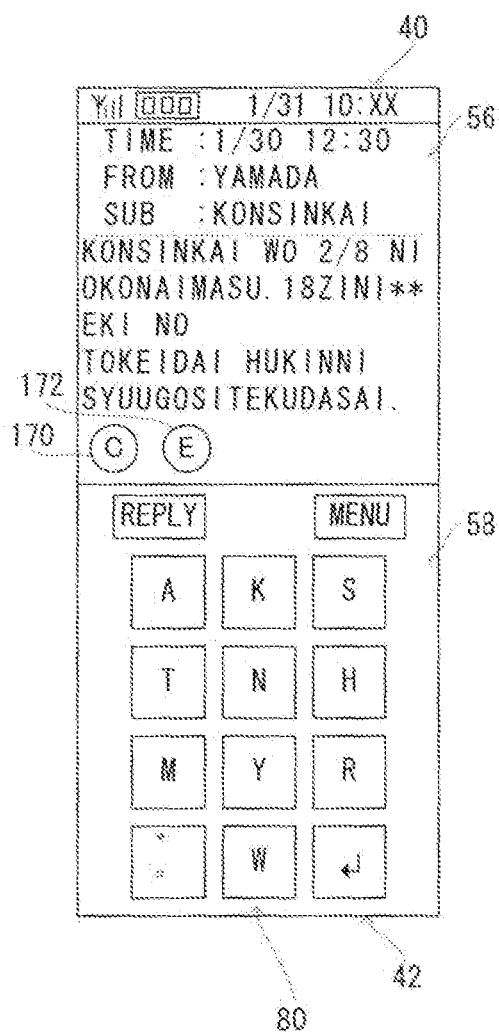
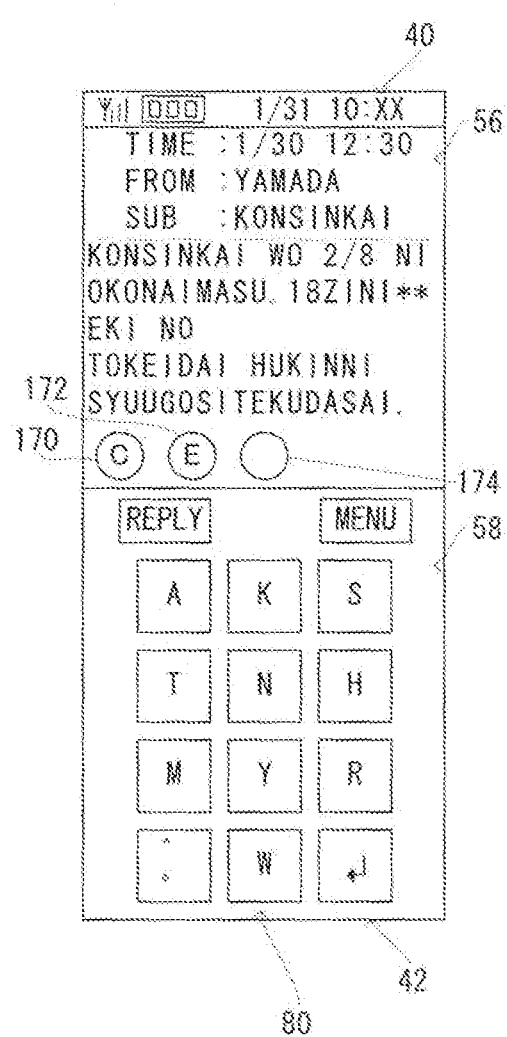
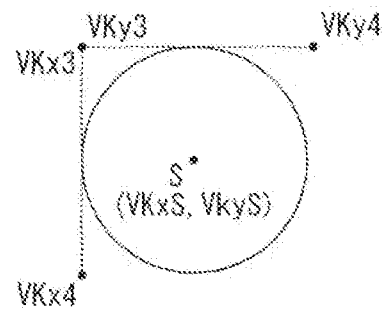

AREA R3

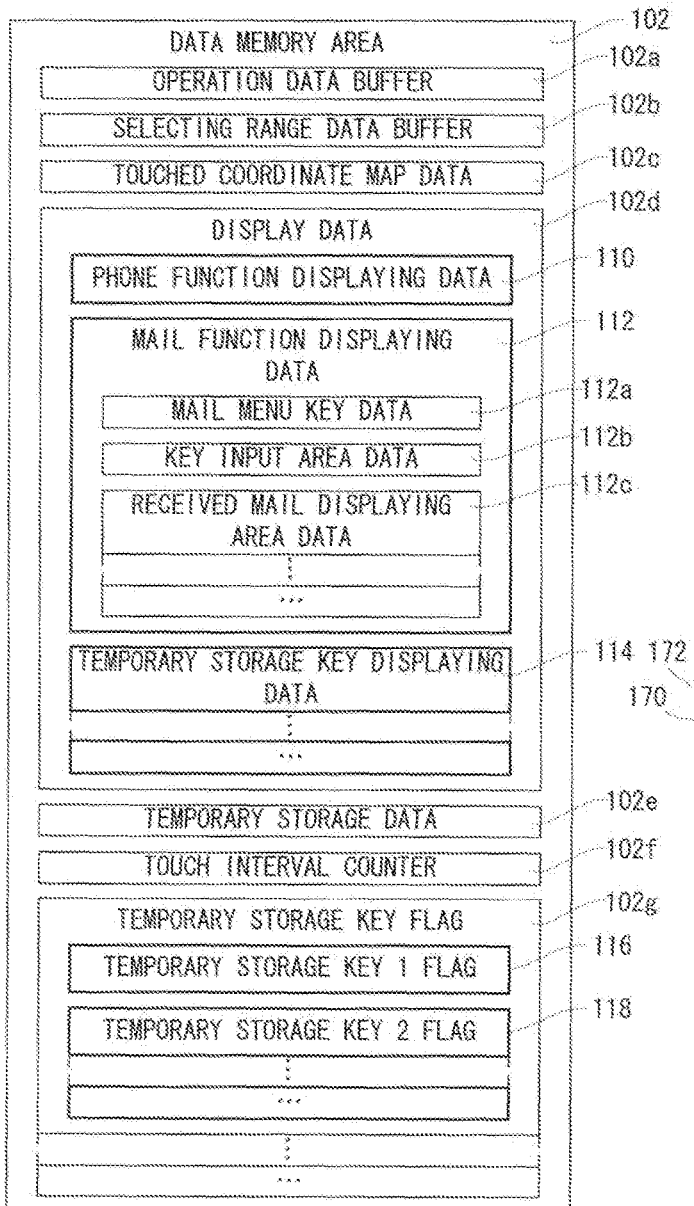
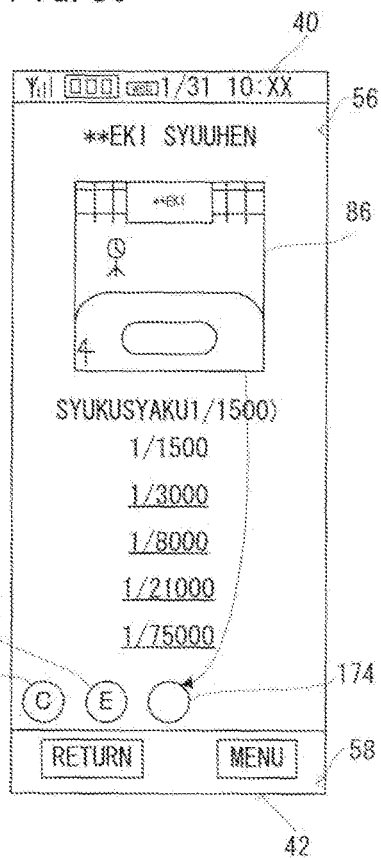
FIG. 26
FIG. 30

MOBILE TERMINAL, RECORDING MEDIUM, AND DATA STORING METHOD

CROSS-REFERENCE TO RELATED APPLICATIONS

The present application is a continuation of U.S. application Ser. No. 12/921,486 which is the U.S. National Stage Application of PCT Application No. PCT/JP2009/054990 filed on Mar. 10, 2009, which claims priority under 35 U.S.C. §119 to Japanese Patent Application No. 2008-063031, filed on Mar. 12, 2008. The content of each of these applications are incorporated herein by reference in their entirety.

TECHNICAL FIELD

The present invention relates to a mobile terminal, a recording medium and a data storing method. More specifically, the present invention relates to a mobile terminal, a recording medium and a data storing method, which are operated by a touch panel.

BACKGROUND ART

An example of this kind of an apparatus is disclosed in Japanese Patent Application Laid-Open No. 2007-280153 [G06F 3/041, G06F 3/023, H03M 11/04] (patent document 1) laid-open on Oct. 25, 2007. The background art is a mobile terminal apparatus that performs a character input by operating character input keys displayed on a touch panel. The mobile terminal apparatus displays an input character displaying area and an input character selecting area on the touch panel being a display portion. In the input character selecting area, a plurality-of-character assigning keys for each of which a plurality of characters are assigned to one key are first displayed at a time of a character input, and when the arbitrary plurality-of-character assigning key is operated, an input area for characters assigned to this plurality-of-character assigning key is further displayed. When an operation is performed on the input area for characters that is displayed again, a character is displayed on the input character displaying area.

Additionally, in the background art disclosed in W21SA by SANYO instruction manual, Page 252 (non-patent document 1) published on Aug. 12, 2004, copying an input character string allows for a movement. More specifically, a cursor is moved by a cursor key to thereby designate the first character of a character string to be moved. By operating a range designation key, the character string to be selected can be place in a designation-capable state. Next, when by operating the cursor key, the range of the character string to be selected is designated, and by operating an endpoint key, the character string is selected, and a screen for selecting functions such as a copying, etc. is displayed. Then, when the copy function is selected, the character string is copied. Successively, the cursor is moved by the cursor key to thereby designate a position where the character string is to be moved. Next, by operating a menu key, a list of "data to be pasted" is displayed. Then, when the copied character string is selected, the copied character string is inserted.

However, in the background art of the patent document 1, a character input can be performed by using the touch panel, but an operation of selecting and copying the input character string cannot be performed.

Furthermore, in the background art of the non-patent document 1, in order to select and copy the input character string, a plurality of input operations are required to be performed, making a user operation complex. Thus, the user cannot easily move the copied character string.

SUMMARY OF THE INVENTION

Therefore, it is a primary object of the present invention to provide a novel mobile terminal.

Another object of the present invention is to provide a mobile terminal capable of easily storing arbitrary data, and easily making use of the stored data.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile terminal, comprising: a display device which displays an arbitrarily selectable data and design; a touched position, detector which is provided on the display device, and detects a touched position; a selector which selects a part or all of the data from the touched position detected by the touched position detector; a position specifier which specifies a start position and an end position of an input from the touched position detected by the touched position detector; a storager which, when the start position specified by the position specifier is a display position of the data selected by the selector, and the end position specified by the position specifier is a display position of the design, stores the data selected by the selector in a storing device such that it is brought into association with the design; and a displayer which displays the data being brought into association with the design that is stored in the storing device on the display device on the basis of the end position specified by the position specifier when the start position specified by the position specifier is the display position of the design.

In the first invention, a display device (32) of a mobile terminal (10) displays an arbitrarily selectable data and design. A touched position detector (24) is provided on the display device, and detects a touched position. A selector (20, S29) selects a part or all of the data from the touched position detected by the touched position detector. A position specifier (20, S25, S27, S31, S75, S79, S81, S85) specifies a start position (touch start) and an end position (touch end) of an input from the touched position detected by the touched position detector. A storager (20, S33), when the start position specified by the position specifier is a display position of the data selected by the selector, and the end position specified by the position specifier is a display position of the design, stores the data selected by the selector in a storing device (28) such that it is brought into association with the design. A displayer (20, S83, S83a) displays the data being brought into association with the design that is stored in the storing device on the display device on the basis of the end position specified by the position specifier when the start position specified by the position specifier is the display position of the design.

For example, the touched position detector is a touch panel, the arbitrarily selectable data is character string data and image data, and the design is a character input key, etc. displayed on the display device. Thus, when a sliding operation is performed from the character string data selected in the text of the mail to the character input key, the selected character string data is stored by being brought into association with the character input key.

In addition, when a sliding operation is performed from the character input key to an arbitrary position of the text of the mail, the data being brought into association with the character input key is displayed on the display device. For example, the displayed data is inserted into the text of the mail on the mail creation screen.

According to the first invention, an operation of sliding from the display position of the selected data to the display position of the design is performed to thereby store the selected data. In addition, an operation of sliding from the display position of the design toward a direction of an arbitrary position is performed to thereby display the data being brought into association with the character input key on the display device. Thus, the user can make the storing device store the selected data and easily utilize the stored data by using the touch panel.

A second invention is according to the first invention, wherein the selector includes a selecting area decider which decides a selecting range on the basis of the start position and the end position that are specified by the position specifier.

In the second invention, a selecting area decider (20, S29, S59) decides a selecting range on the basis of the start position and the end position that are specified by the position specifier. For example, if the arbitrarily selectable data is character string data, only the specific character string data can be regarded as selected character string data.

According to the second invention, in the arbitrarily selectable data, only the data that the user wants to store can be selected.

A third invention is according to the first invention or the second invention, further comprising a data displayer which displays the data being brought into association with the design that is stored in the storing device when the start position specified by the position specifier is the display position of the design.

In the third invention, a data displayer (20, S77, S115) displays the data being brought into association with the design that is stored in the storing device when the start position specified by the position specifier is the display position of the design. For example, the data being brought into association with the design is displayed before it is inserted into the text of the mail on the mail creation screen.

According to the third invention, the user can previously confirm the data associated with the design, and therefore, it is possible to prevent erroneous data being inserted.

A fourth invention is according to the third invention, wherein the data displayer includes a time counter which counts a time when the start position is specified by the position specifier, and the data displayer displays the data being brought into association with the design that is stored in the storing device when a predetermined time elapses from the time is counted by the time counter.

In the fourth invention, a time counter (20, 5109, S113) counts a time when the start position is specified by the position specifier. The data displayer displays the data being brought into association with the design that is stored in the storing device when the time counted by the time counter is after a predetermined time. In a case that a character input function is assigned to the design, the character input operation and the displaying operation are switched depending on the times during which respective operations are performed.

According to the fourth invention, it takes the predetermined time before the data that is brought into association with the design is displayed, and therefore, the two functions can be assigned to the "design" so as to be utilized.

A fifth invention is according to the third invention, further comprising a display eraser which erases the display of the data stored in the storing device by being brought into association with the design that is displayed on the data displayer when the end position is detected by the position specifier.

In the fifth invention, a display eraser (20, S87) erases the display of the data stored in the storing device by being brought into association with the design that is displayed on the data displayer when the end position is detected by the position specifier. For example, when the displayed data is inserted into the text of the mail on the mail creation screen, the display of the data that is brought into association with the design is also erased.

According to the fifth invention, the display of the data that is brought into association with the design is not maintained, capable of improving the convenience.

A sixth invention is according to the first invention, further comprising a design adder which adds a design to be displayed on the display device.

In the sixth invention, a design adder (20, S149) adds a design to be displayed on the display device. That is, the user can arbitrarily increase the design for storing the data.

A seventh invention is according to the sixth invention, further comprising a design eraser which erases the design added by the design adder.

In the seventh invention, a design eraser (20, S173, S175) erases the design added by the design adder.

According to the sixth invention and the seventh invention, the number of designs for storing data can arbitrarily be changed, and therefore, the number of designs can be changed according to the number of pieces of data to be stored.

An eighth invention is according to the first invention, and further comprising a display condition changer which, when the data selected by the selector is stored by being brought into association with the design, changes a display condition of the design.

In the eighth invention, a display condition changer (20, S35) changes a display condition of the design when the data selected by the selector is stored by being brought into association with the design. For example, the color of the design is changed.

According to the eighth invention, it is possible to easily identify the design utilized for storing the data.

A ninth invention is a storage medium storing a data storing program so as to be readable by a computer in a mobile terminal including a display device which displays an arbitrarily selectable data and design, a touched position detector which is provided on the display device and detects a touched position, and a storing device, the data storing program causes the computer to execute: a selecting step for selecting a part or all of the data from the touched position detected by the touched position detector; a position specifying step for specifying a start position and an end position of an input from the touched position detected by the touched position detector; a storing step for, when the start position specified by the position specifier is a display position of the data selected by the selector, and the end position specified by the position specifier is a display position of the design, storing the data selected by the selector in a storing device such that it is brought into association with the design; and a displaying step for displaying the data being brought into association with the design that is stored in the storing device on the display device on the basis of the end position specified by the position specifier when the start position specified by the position specifier is the display position of the design.

In the ninth invention as well, similar to the first invention, the user can make the storing device store the selected data and easily utilize the stored data by using the touch panel.

A tenth invention is a data storing method of a mobile terminal including a display device which displays an arbitrarily selectable data and design, a touched position detector which is provided on the display device and detects a touched position, and a storing device, including following steps of: a selecting step for selecting a part or all of the data from the touched position detected by the touched position detector; a position specifying step for specifying a start position and an end position of an input from the touched position detected by the touched position detector; a storing step for, when the start position specified by the position specifier is a display position of the data selected by the selector, and the end position specified by the position specifier is a display position of the design, storing the data selected by the selector in a storing device such that it is brought into association with the design; and a displaying step for displaying the data being brought into association with the design that is stored in the storing device on the display device on the basis of the end position specified by the position specifier when the start position specified by the position specifier is the display position of the design.

In the tenth invention as well, similar to the first invention, the user can make the storing device store the selected data and easily utilize the stored data by using the touch panel.

The above described objects and other objects, features, aspects and advantages of the present invention will become more apparent from the following detailed description. of the present invention when taken in conjunction with the accompanying drawings.

BRIEF DESCRIPTION OF THE DRAWINGS

FIG. 9 is an illustrative view showing a procedure of inserting the temporarily stored character string in FIG. 5 into the text of the reply mail.

FIG. 16 is an illustrative view showing reply mail processing program to be executed by the CPU of the mobile terminal in FIG. 1 of the invention of the first embodiment.

FIG. 18 is an illustrative view showing a display example of an invention of a second embodiment in a mail function of the mobile terminal shown in FIG. 1.

FIG. 26 is an illustrative view showing one example of another part of the memory map of the RAM shown in FIG. 1 of the invention of the second embodiment.

FIG. 30 is an illustrative view showing a display example of the invention of the second embodiment in a browser function of the mobile terminal shown in FIG. 1.

BEST MODE FOR PRACTICING THE INVENTION

First Embodiment

Figure 1:
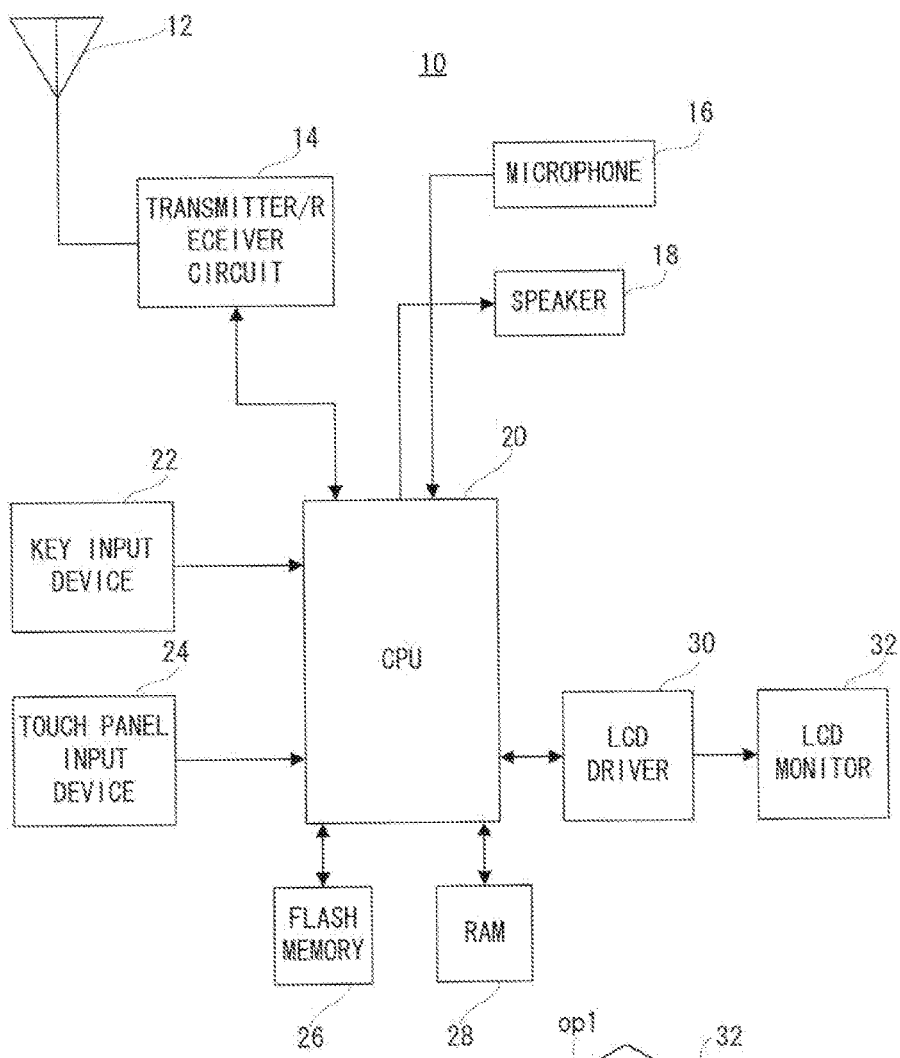
FIG. 1 is a block diagram showing a mobile terminal of one embodiment of the present invention.

Referring to FIG. 1, a mobile terminal 10 includes a key input device 22 and a touch panel input device 24 being a touched position detector. When a call-out operation is performed by the key input device 22 or the touch panel input device 24, a CPU (may be referred to as a processor or a computer) 20 controls a transmitter/receiver circuit 14 conforming to a CDMA system to output a call-out signal. The output call-out signal is transmitted from an antenna 12 to be transmitted to a mobile communication network including base stations. Then, when a communication partner performs a response operation, a communication capable state is established.

When a conversation end operation is performed by the key input device 22 after a transition to the communication capable state, the CPU 20 controls the transmitter/receiver circuit 14 to transmit a conversation end signal to the mobile communication network including the base stations. After transmitting the conversation end signal, the CPU 20 ends the conversation processing. In a case that a conversation end signal is first received from the communication partner as well, the CPU 20 ends the conversation processing. Furthermore, in a case that a conversation end signal is received from the mobile communication network not from the communication partner as well, the CPU 20 ends the conversation processing.

When a call-out signal from the communication partner is received by the antenna 12 in a state that the power of the mobile terminal 10 is turned on, the transmitter/receiver circuit 14 notifies the CPU 20 of the incoming. The CPU 20 outputs calling source information described in the incoming call notification to the LCD monitor 32 (display device) controlled by the LCD driver 30, and outputs an incoming call tone from the incoming call notifying speaker not shown. When a responding operation is performed by the key input device 22, a communication capable state is established.

A following processing is executed in the communication capable state. A modulated sound signal (high frequency signal) transmitted from the communication partner is received by the antenna 12. The received modulated sound signal undergoes demodulation processing and decode processing by the transmitter/receiver circuit 14. The reception sound signal thus obtained is output from the speaker 18. Furthermore, a transmission sound signal captured by the microphone 16 undergoes encoding processing and modulation processing by the transmitter/receiver circuit 14. The modulated sound signal thus generated is transmitted by utilizing the antenna 12 as described above.

Figure 2:
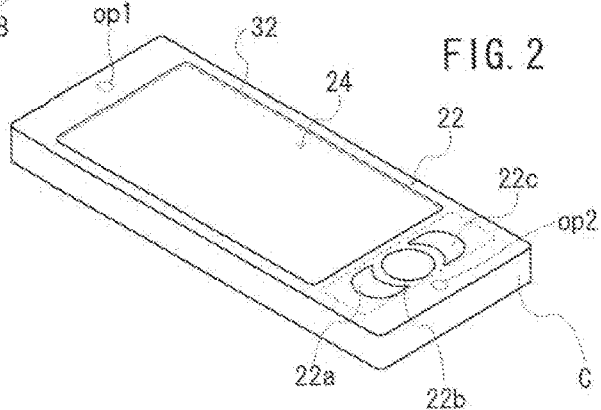
FIG. 2 is an illustrative view showing an appearance of the mobile terminal shown in FIG. 1.

FIG. 2 is an external view showing an appearance of the mobile terminal 10.

Referring to FIG. 2, the mobile terminal 10 has a case C formed in a plate shape. The microphone 16 and the speaker 18 that are not shown in FIG. 2 are contained in the case C. An opening op2 leading to the contained microphone 16 is provided on a main surface of the case C at an one end in a longitudinal direction, and an opening op1 leading to the contained speaker 18 is provided on the main surface of the case C at the other end in the longitudinal direction. That is, the user listens to a sound output from the speaker 18 through the opening op1, and inputs a sound to the microphone 16 via the opening op2.

The key input device 22 includes three kinds of keys, such as a talk end key 22a, a menu key 22b and a talk key 22c each of which is provided on the main surface of the case C. The LCD monitor 32 is attached such that the monitor screen is exposed from the main surface of the case C, and on a top surface of the LCD monitor 32, a touch panel input device 24 is provided.

Figure 3:
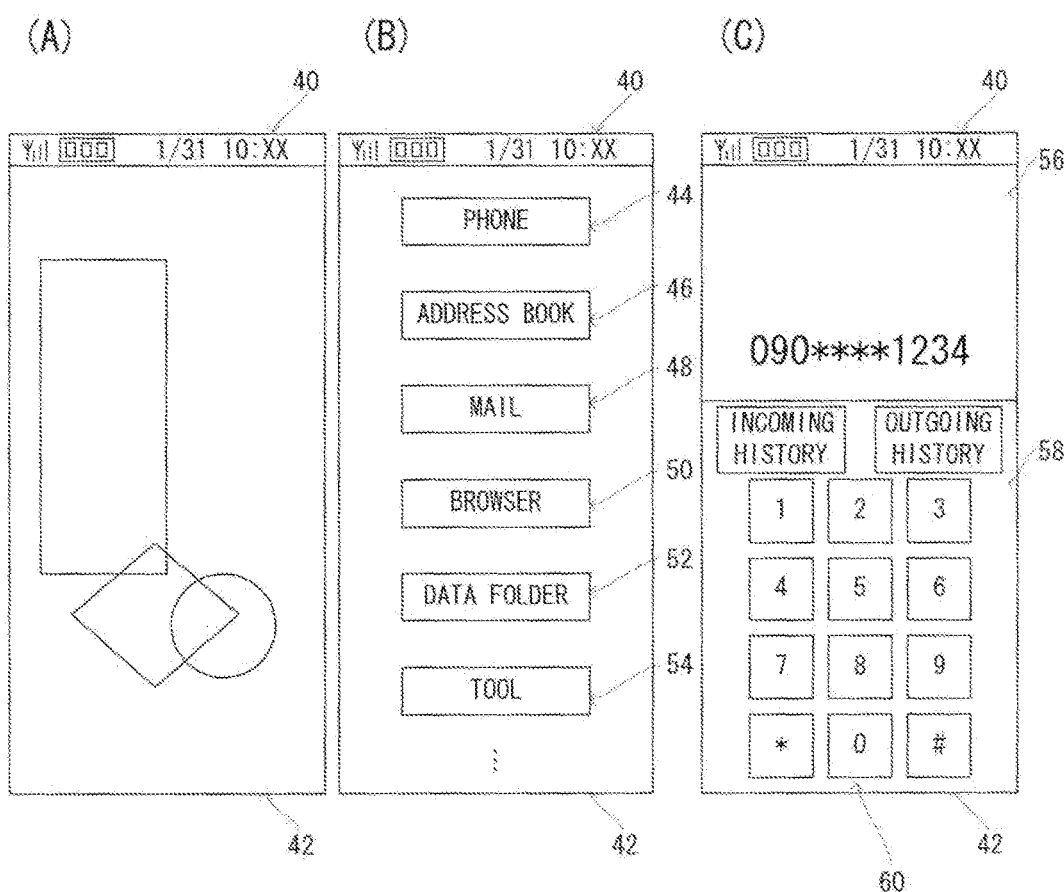
FIG. 3 is an illustrative view showing a display example of an LCD monitor of the mobile terminal shown in FIG. 1.

The user operates the talk end key 22a to thereby perform a talk end operation, etc., and operates the talk key 22c to thereby perform a responding operation, a power on-off operation of the mobile terminal 10, etc. In addition, the user operates the menu key 22b to thereby display a menu screen shown in FIG. 3(B) on the LCD monitor 32.

Moreover, the touch panel input device 24 can use any one of a resistance film system, an optical system (infrared rays system) and an electrostatic capacity coupling system. The touch panel input device 24 is a pointing device for allowing the user to designate an arbitrary position within the screen of the LCD monitor 32. When the touch panel input device 24 is operated by a push, a stroke (slide), a touch of the top surface, it outputs coordinates data at the operation position operated by the user. That is, by pushing, stroking, touching the top surface of the touch panel input device 24 with the finger, the user can input a direction of the operation, a design, etc. to the mobile terminal 10.

Here, an operation of touching the top surface of the touch panel input device 24 with a pen or by the fingers by the user is referred to as "touching". On the other hand, an operation of releasing the fingers, etc. from the touch panel input device 24 is referred to as "releasing". Then, coordinates of a start position of an operation designated by a touch are called a "touch start", and coordinates of an end position of the operation designated by a release is called as a "touch end". Moreover, an operation of touching the top surface of the touch panel input device 24 with a pen or by the fingers, and then releases it by the user shall be called a "touch operation".

Here, it is needless to say that an operation performed on the touch panel input device 24 may be performed by a stick having a tapered shape like a pen, or the like without being restricted to the fingers. In addition, a dedicated-touch pen for performing an operation may be provided.

Each of FIG. 3(A) to FIG. 3(C) is an illustrative view showing a display example of the LCD monitor 32. FIG. 3(A) is a display example showing a standby condition of the mobile terminal 10. Referring to FIG. 3(A), a condition display area 40 and an image displaying area 42 are displayed on the LCD monitor 32. In the condition display area 40; a sensitivity of the antenna 12, a remaining amount of the battery, a current time, etc. are displayed. In the image displaying area 42, image data indicating a standby condition if the mobile terminal 10 is in the standby condition, for example is displayed. Furthermore, various images are displayed on the image displaying area 42 in correspondence with the executed function.

It should be noted that the condition display area 40 and the image displaying area 42 are the same with those in other display examples, and in the other display examples, detailed explanations are omitted for simplicity.

FIG. 3(B) is a display example showing a menu screen. The menu screen is displayed when the menu key 22b is operated. Referring to FIG. 3(B), in the image displaying area 42, a phone function key 44, an address book function key 46, a mail function key 48, a browser function key 50, a data folder function key 52, a tool function key 54, etc. are displayed. The user performs a touch operation on an arbitrary function key to thereby execute a function corresponding to the arbitrary function key. For example, when a touch operation is performed on the phone function key 44, an image representing execution of a phone function (see FIG. 3(C)) is displayed on the LCD monitor 32.

Figure 4:
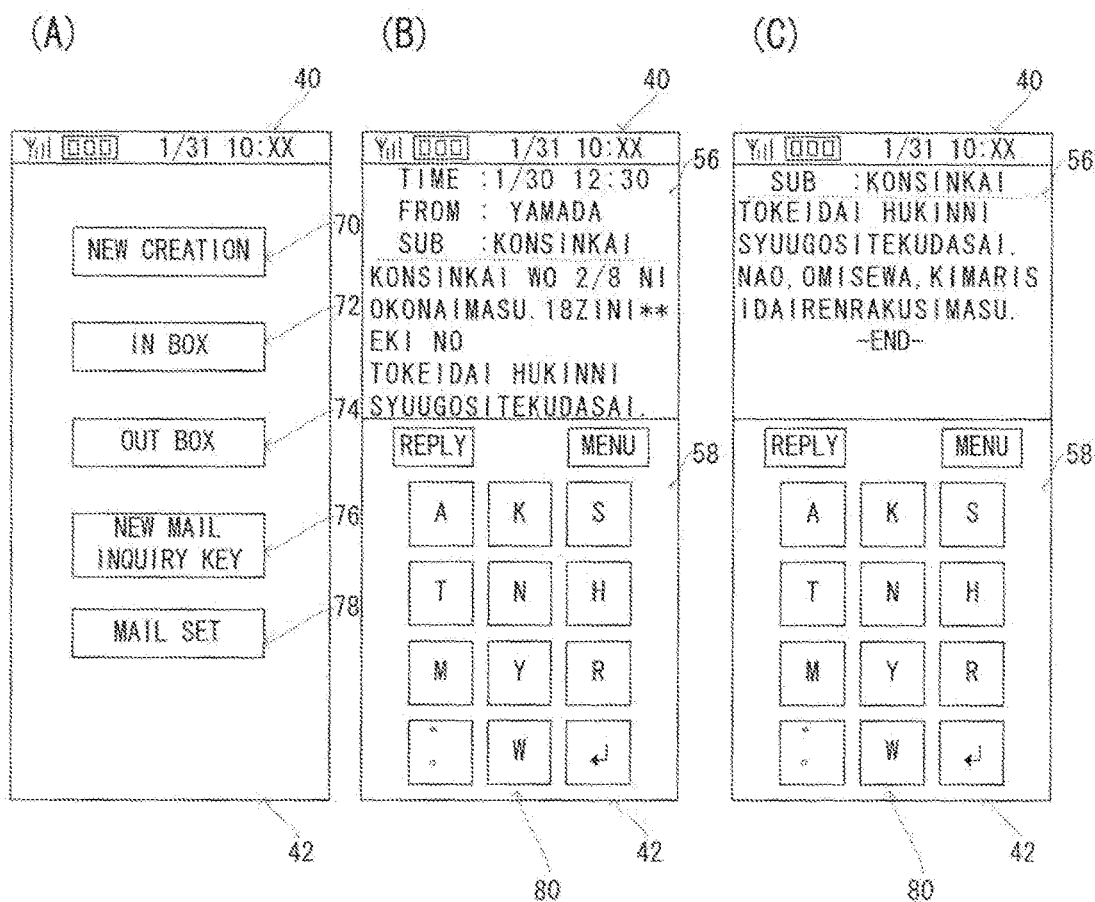
FIG. 4 is an illustrative view showing a display example of a first embodiment in a mail function of the mobile terminal shown in FIG. 1.

A working when a touch operation is performed on each of the function keys is simply explained. When a touch operation is performed on the phone function key 44, the mobile terminal 10 executes the phone function as described above. When a touch operation is performed on the address book function key 46, the mobile terminal 10 displays a registered address book. When a touch operation is performed on the mail function key 48, the mobile terminal 10 executes a mail function as shown in FIG. 4(A) to FIG. 4(C). When a touch operation is performed on the browser function key 50, the mobile terminal 10 connects to a network not shown, and displays data obtained by making data communications with a server not shown on the LCD monitor 32. When a touch operation is performed on the data folder function key 52, the mobile terminal 10 displays a content of a data folder in which image data, etc. stored in the flash memory 26 is stored on the LCD monitor 32. When a touch operation is performed on the tool function key 54, a screen for changing the setting of the mobile terminal 10 (current time, contrast of the LCD monitor 32) is displayed on the LCD monitor 32.

It should be noted that in a case of a mobile terminal 10 having more functions, such as a camera function, a TV tuner function, etc., more function keys are displayed on the menu screen.

FIG. 3(C) is a display example in a case that a touch operation is performed on the aforementioned phone function key 44. Referring to FIG. 3(C), the image displaying area 42 includes a function displaying area 56 and a key input area 58. In the function displaying area 56, a result when a touch operation is performed on the key included in the key input area 58 is displayed. The key input area 58 includes input keys 60 for the phone function, and specifically includes numeric input keys (0-9) for inputting a numerical number, an incoming history and an outgoing history.

When a touch operation is performed on any numeric input key, a numerical string (phone number) corresponding to the numeric input keys on which touch operations are performed is displayed in the function displaying area 56. Then, when the talk key 22c is operated, the mobile terminal 10 sends a call-out signal for establishing a conversation condition with a phone apparatus corresponding to the input phone number.

Here, the key input area 58 and the function displaying area 56 are the same as those in other drawings, and in other drawings, detailed explanations therefor will be omitted for simplicity.

Each of FIG. 4(A) to FIG. 4(C) is an illustrative view showing a display example of a mail function. FIG. 4(A) is a screen to be displayed after a touch operation is performed the mail function key 48 on the menu screen shown in FIG. 3(B). Referring to FIG. 4(A), in the image displaying area 42, a new create key 70, an in-box key 72, an out-box key 74, a new mail inquiry key 76 and a mail set key 78 are displayed. When a touch operation is performed on the new create key 70, the mobile terminal 10 displays a screen for creating a new mail on the LCD monitor 32. When a touch operation is performed on the in-box key 72, the mobile terminal 10 displays a list of received mails. When a touch operation is performed on the out-box key 74, the mobile terminal 10 displays a list of sent mails on the LCD monitor 32. When a touch operation is performed on the new mail inquiry key, the mobile terminal 10 inquires of a mail server not shown whether or not undelivered newly received mails are not accumulated. When a touch operation is performed on the mail set key 78, the mobile terminal 10 displays a screen for changing the setting of the mail function (setting of automatically receiving an e-mail, etc).

FIG. 4(B) is a display example when the content of a certain received mail is confirmed. Referring to FIG. 4(B), similar to the phone function, the image displaying area 42 includes the function displaying area 56 and the key input area 58. In the function displaying area 56, information as to the certain received mail (receipt time, sender, title, etc. of the mail) and a text of the received mail are displayed.

In the key input area 58, the input keys 80 of the mail function are displayed including a character input key for inputting a character, a reply key, a menu key for the mail function, etc. For example, the character input key includes an "A" line character input key. The "A" line character input key is a key for inputting characters, such as "A, I, U, E, O" (hiragana characters, for example), and allowing each of characters in the line to be designated and input in response to a touch operation. If the user performs a touch operation once, the character "A" can be input, and if he or she performs a touch operation once again, the character "I" can be input.

When a sliding is performed on the function displaying area 56 in a vertical direction, the content in the function displaying area 56 is scrolled vertically. That is, when the touch start and the touch end are indicated by different coordinates, the displayed content is scrolled. For example, if the touch start is designated at an upper part of the function displaying area 56 and the touch end is designated at a lower part of the function displaying area 56, the displayed content of the function displaying area 56 is scrolled downward to display a text of the received mail which is not displayed in FIG. 4(B) as shown in FIG. 4(C). In addition, if the touch start is designated at a lower part of the function displaying area 56, and the touch end is designated at an upper part of the function displaying area 56 in FIG. 4(C), the displayed content of the function displaying area 56 is scrolled upward to, be returned to the display condition in FIG. 4(B).

When a touch operation is performed at a position where no key is displayed within the key input area 58 shown in FIG. 3(C) and FIG. 4(B), the display of the character input key is hidden, and the reply key and the menu key are displayed. In addition, when a touch operation is performed at a position where no key is displayed with the character input key hidden, the mobile terminal 10 displays the character input key again.

Here, in the input area 58, in response to sliding from up to down at a position where no key is displayed, the character input key may be hidden, and in response to sliding from down to up, the hidden character input key may be displayed again.

The mobile terminal 10, here, has a function of easily storing a character string included in the text of the received e-mail in response to a touch operation on the touch panel input device 24, and easily inserting the stored character string into the text of the reply mail.

Figure 5:
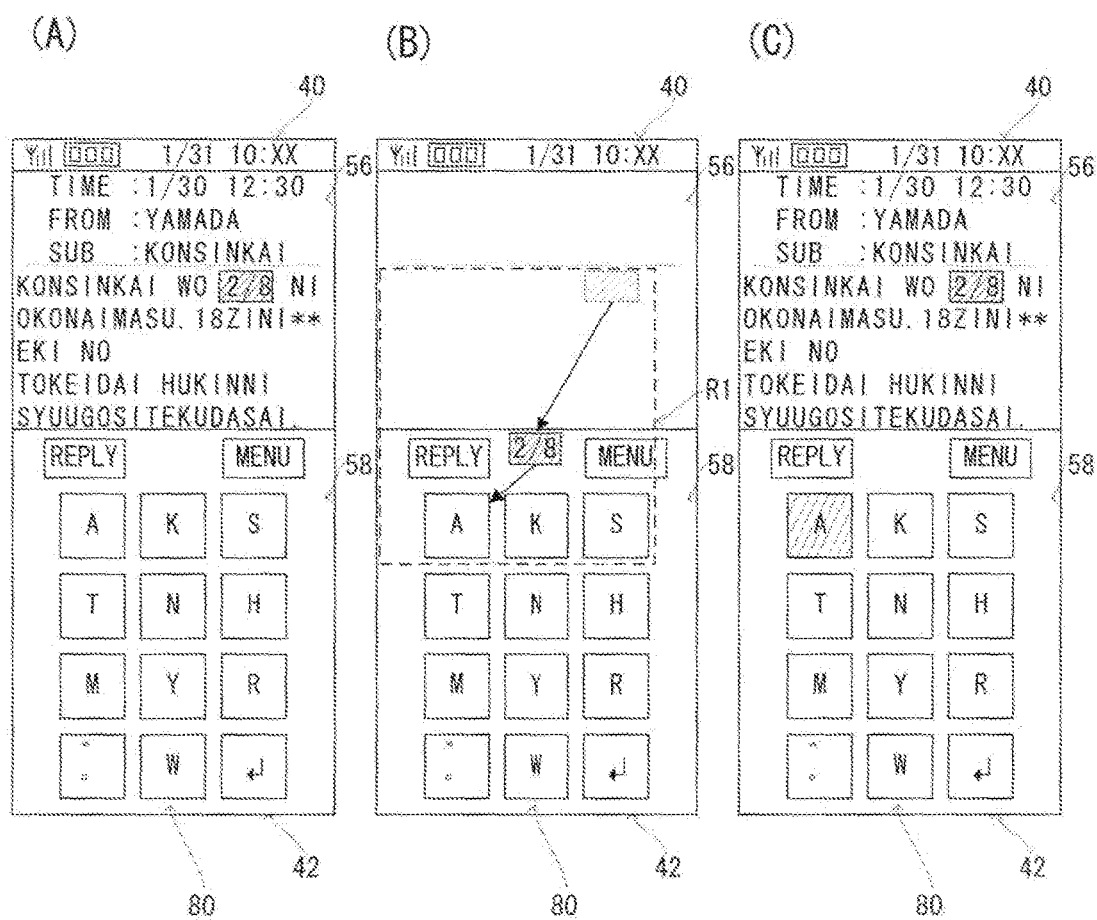
FIG. 5 is an illustrative view showing a procedure of temporarily storing a character string of the invention of the first embodiment in a received mail received by the mobile terminal shown in FIG. 1.

To put it briefly, when a character string in the text of the received mail is selected on the basis of the coordinates of the touch start by a touch and the coordinates of the touch end by a release, a character string of "2/8", for example, is in a selected state as shown in FIG. 5(A). In addition, when a touch start is designated within the display coordinates of the character string in the selected state, and a touch end is designated within the display coordinates of the "A" line character input key, etc., the selected character string is stored in the memory area indicated by the memory address of the RAM 28 being a storing device which is brought into correspondence with the arbitrary character input key.

That is, as shown in FIG. 5(B), when the user touches the selected character string, then slides and releases it at an arbitrary character input key, the selected character string is temporarily stored in the memory area indicated by the memory address corresponding to the arbitrary character input key. The operation of touching, sliding and then releasing is hereinafter referred to as a touch and slide operation.

Here, the character input key designated by the touch end may be other keys, such as a "K" line character input key and a "S" line character input key without being restricted to the "A" line character input key.

Figure 8:
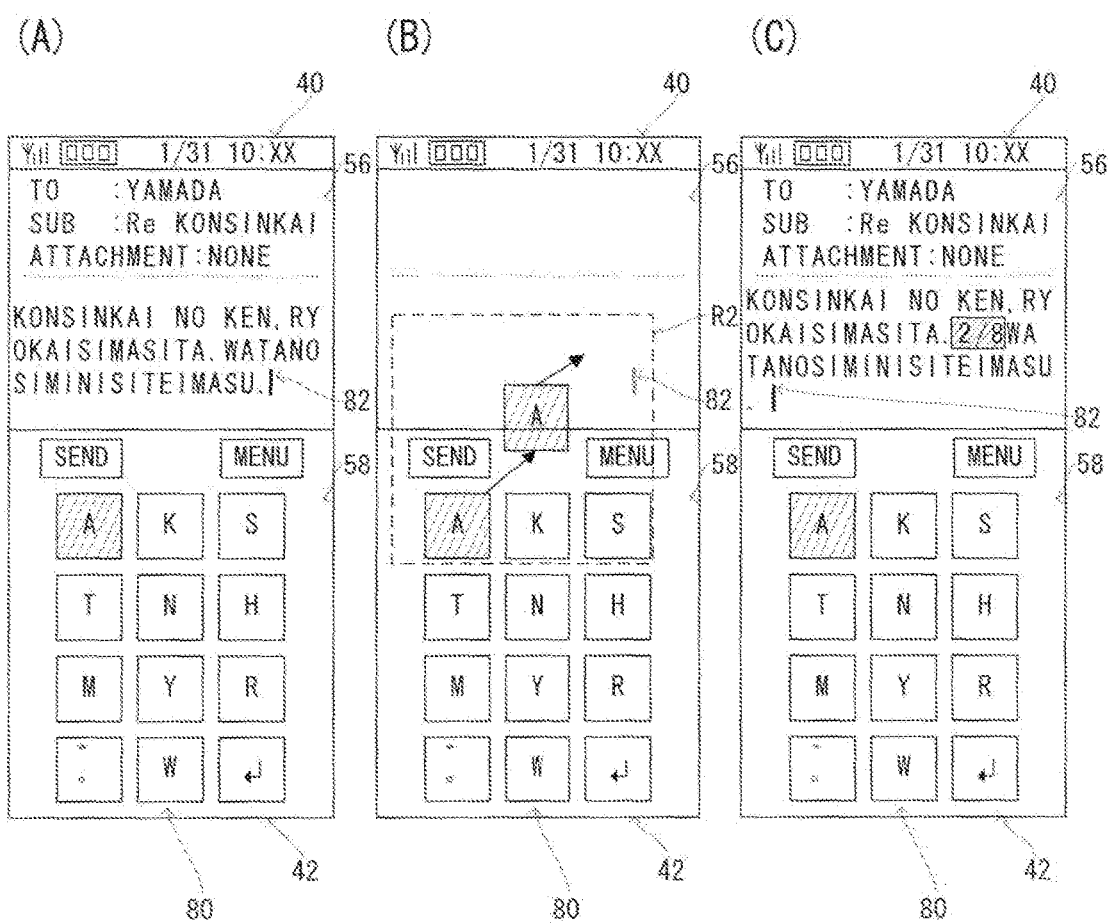
FIG. 8 is an illustrative view showing a display example of the invention of the first embodiment of a reply mail in response to the received mail received by the mobile terminal shown in FIG. 1.

Then, as shown in FIG. 8(B), when a touch start is designated within the display coordinates of the "A" line character input key, and a touch end is designated at an arbitrary position in the text of the reply mail, the character string temporarily stored is inserted into the arbitrary position as shown in FIG. 8(C).

That is, as shown in FIG. 8(B), a touch and slide operation is performed from the "A" line character input key to the arbitrary coordinates in the text of the reply mail, the character string temporarily stored is inserted (displayed) into the character string data of the text of the reply mail displayed on the LCD monitor 32 on the basis of the arbitrary position.

First, a procedure of temporarily storing the character string is explained in detail. Each of FIG. 5(A) to FIG. 5(C) is an illustrative view explaining a procedure of temporarily storing a selected character string. Referring to FIG. 5(A), in the text of the received mail displayed in the function displaying area 56, the character string of "2/8" is being selected, and a procedure of selecting the character string of "2/8" is explained in detail with reference to FIG. 6(A) to FIG. 6(E).

Figure 6:
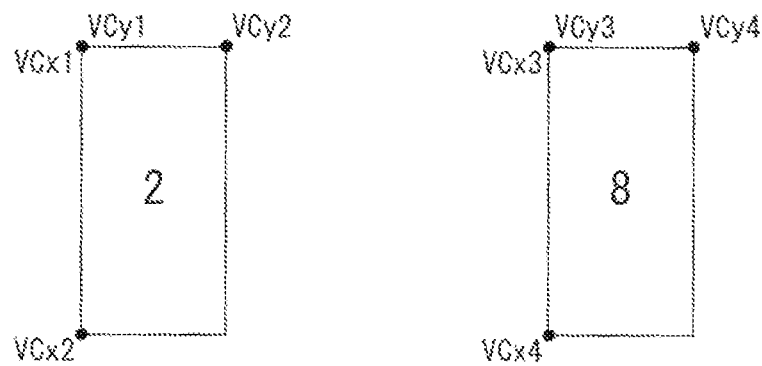
FIG. 6 is an illustrative view showing a procedure of selecting the character string shown in FIG. 5.

As shown in FIG. 6(A) to FIG. 6(C), the character displaying area of "2" is shown in FIG. 6(B), and the character displaying area of "8" is shown in FIG. 6(C). FIG. 6(B) is an illustrative view showing the display coordinates of "2". Then, the range defined by coordinates VCx1 and coordinates VCx2 in a direction of the longitudinal axis and by coordinates VCy1 and coordinates VCy2 in a direction of the lateral axis is a display area of "2". Similarly, the range defined by coordinates VCx3 and coordinates VCx4 in the direction of the longitudinal axis and coordinates VCy3 and coordinates VCy4 in the direction of the lateral axis is a display area of "8". Here, the character displaying area is different in size depending on a two-byte character and a one-byte character.

Referring to FIG. 6(D), the coordinates indicated by a point a is included in the display area of "2" shown in FIG. 6(B), and the coordinates indicated by a point b is included in the display area of "8" shown in FIG. 6(C). For example, if the point a is designated as a touch start by a touch, and the point b is designated as touch end by a release, that is, if sliding from the point a to the point b is performed, the characters between the character of "2" designated by the touch start and the character of "8" designated by the touch end becomes a selected character string as shown in FIG. 6(E). Then, the display color of the selected character string of "2/8" is changed. Thus, in this embodiment, the user can arbitrarily select the character string he or she wants to temporarily store.

Next, FIG. 5(B) is an illustrative view showing a situation in which a touch and slide operation is performed from the selected character string of "2/8" to the "A" line character input key. Furthermore, a procedure of temporarily storing the selected character string of "2/8" in the memory area indicated by the memory address corresponding to the "A" line character input key is explained by utilizing FIG. 7.

Figure 7:
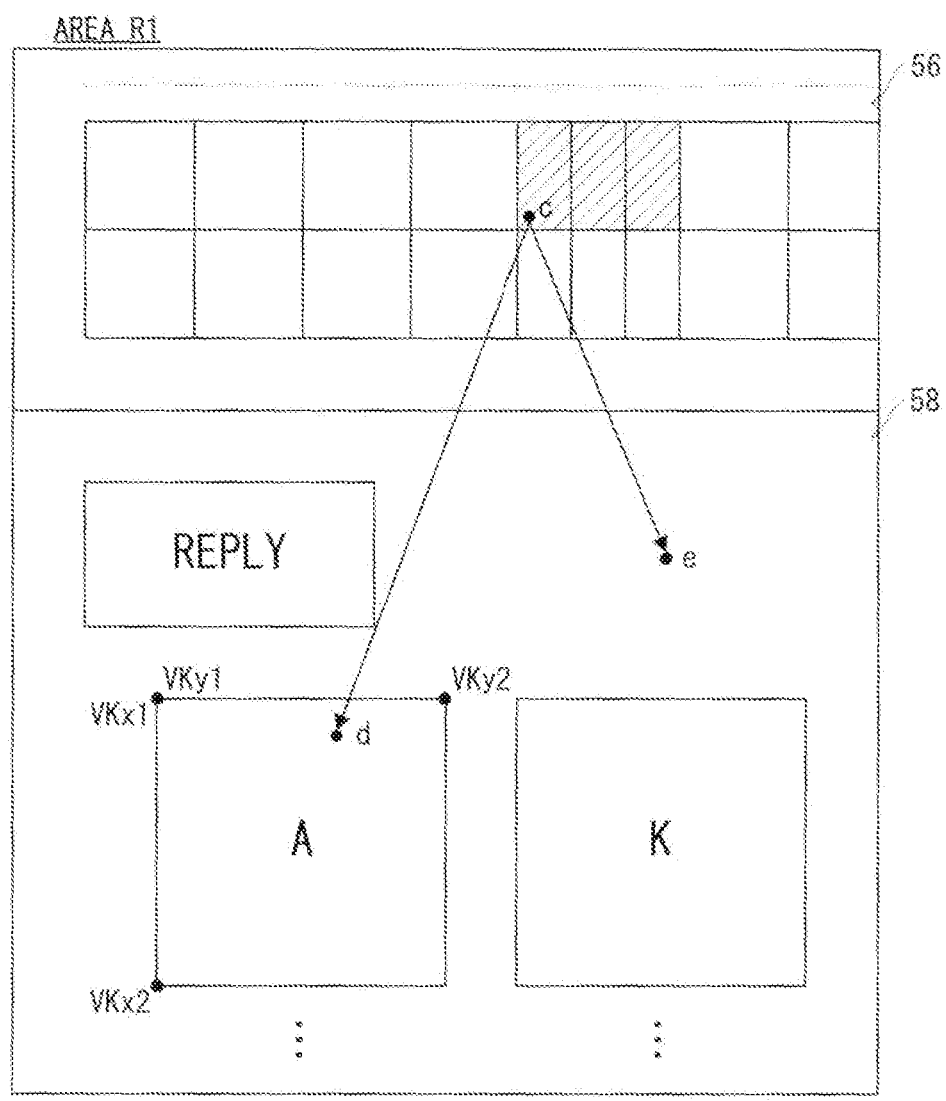
FIG. 7 is an illustrative view showing in detail a procedure of temporarily storing the selected character string shown in FIG. 5.

FIG. 7 is a schematic view showing an area R1 in FIG. 5(B) in an enlarged manner. Referring to FIG. 7, the range defined by coordinates VKx1 and coordinates VKx2 in the direction of the longitudinal axis and coordinates VKy1 and coordinates VKy2 in the direction of the lateral axis is the display area of the "A" line character input key. The coordinates indicated by a point c are included in the display coordinates of "2" contained in the selected character string. A point d is included in the display coordinates of the "A" line character input key. Then, the coordinate indicated by a point e is an arbitrary point that is not included in the display coordinates of the respective keys of the input keys 80 for the mail function.

In a case that the point c is designated as a touch start by a touch, and the point d is designated as a touch end as a release, that is, if sliding from the point c to the point d is performed, the selected character string of "2/8" is temporarily stored in the memory area indicated by the memory address corresponding to the "A" line character input key. Here, if the point c is designated as a touch start by a touch, and the point e is designated as a touch end by a release, the selected character string of "2/8" is not temporarily stored. Furthermore, another character string may be temporarily stored in another character input key at the same time as the "A" line character input key.

Referring to FIG. 5(C), the display color of the "A" line character input key is displayed in a color different from the other character input keys. This makes it possible for the user to easily identify the character input key used for temporarily storing the character string.

Next, a procedure of inserting the temporarily stored character string into the text of the reply mail is explained. Each of FIG. 8(A) to FIG. 8(C) is an illustrative view showing a procedure of inserting the character string temporarily stored to the text of the sent mail. Referring to FIG. 8(A), the "A" line character input key displayed in the key input area 58 is displayed in a color different from the other character input keys.

FIG. 8(B) shows a situation in which a touch and slide operation is performed from the "A" line character input key to the area where the text of the reply mail is displayed. A procedure of inserting the character string temporarily stored to the character string of the text of the reply mail is explained by utilizing FIG. 9(A) and FIG. 9(B) below.

FIG. 9(A) is an illustrative view showing the display coordinates of "wa" included in the character string of "wa tanosimi . . . " shown in FIG. 8(A). Referring to FIG. 9(A), the range defined by coordinates VCx5 and coordinates VCx6 in the direction of the longitudinal axis and coordinates VCy5 and coordinates VCy6 in the direction of the lateral axis is a display area of "wa".

FIG. 9(B) is a schematic view showing the area R2 in FIG. 8(B) in a more enlarged manner. Referring to FIG. 9(B), the coordinates indicated by a point g is included in the display coordinates of "wa". The coordinates indicated by a point f is included in the display coordinates of the "A" line character input key. The coordinates indicated by a point h is an arbitrary point that is not included in the display coordinates of the respective keys of the input keys 80 for the mail function.

Here, in a case that the point f is designated as a touch start by a touch, and the point g is designated as a touch end by a release, that is, if sliding is performed from the point f to the point g, the character string that is stored by being brought into correspondence with the "A" line character input key is inserted ahead of the character string of "wa tanosimi . . . " of the text of the reply mail. Then, as to each character after the character string of "wa tanosimi" in the character string indicating the text of the reply mail, the storing position in the memory area of the RAM 28 is changed. Here, in a case that the point h is designated as a touch end by a release, the character string is not inserted into the text of the reply mail.

Referring to FIG. 8(C), the inserted character string of "2/8" is displayed in the text of the reply mail as a selected character string.

Thus, by selecting the character string that the user wants to temporarily store with a touch operation in the received mail, and making a touch and slide operation from the selected character string to an arbitrary character input key, it becomes possible to store the selected character string by the user. In addition, in a case that a reply mail is created, by performing a touch and slide operation from the character input key corresponding to the temporarily stored character string to a position to be inserted by the user, it becomes possible to insert the character string temporarily stored.

Then, if one second elapses from the touch of the character input key, the character string temporarily stored is temporarily displayed on the LCD monitor 32.

Figure 10:
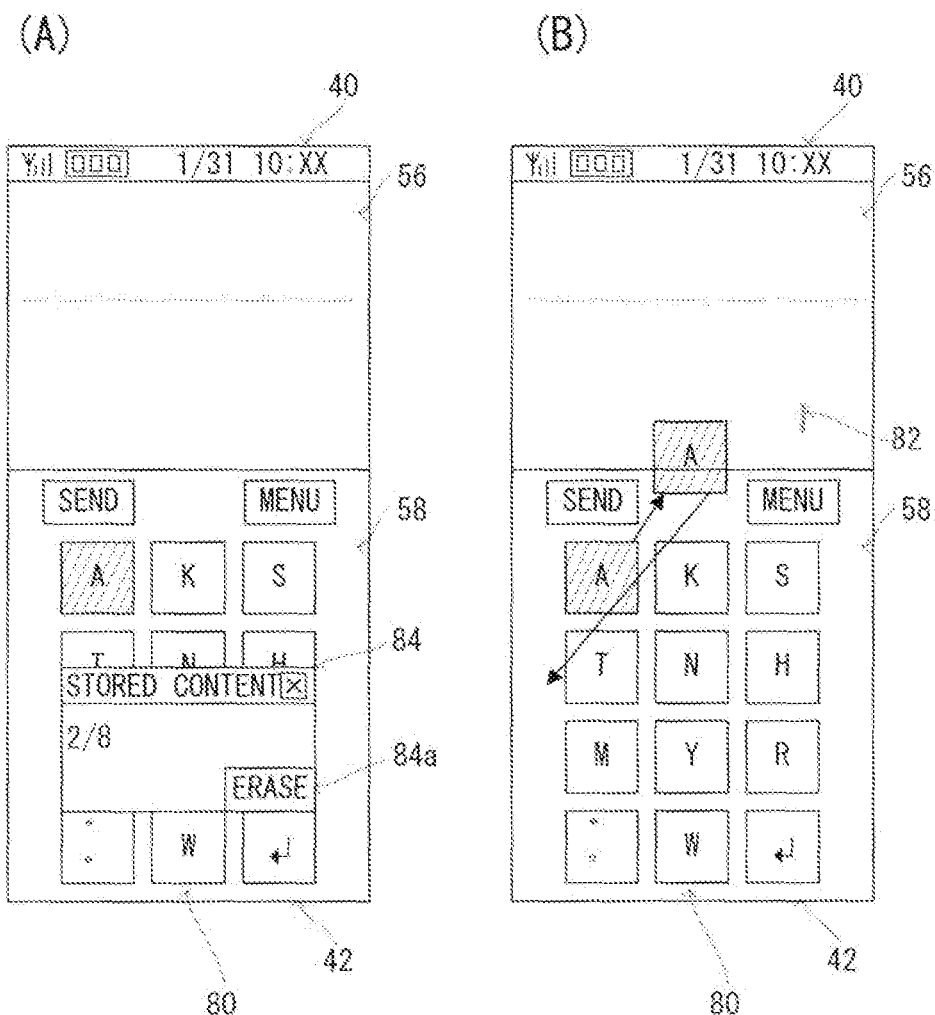
FIG. 10 is an illustrative view showing a display example of the temporarily stored character string shown in FIG. 5.

More specifically, as shown in FIG. 10(A), the character string temporarily stored is temporarily displayed. FIG. 10(A) is an illustrative view showing a display example of temporarily displaying the character string temporarily stored. Referring to FIG. 10(A), a stored content temporary displaying window 84 shows the character string temporarily stored by being brought into correspondence with the "A" line character input key. Here, the character string of "2/8" is displayed. The stored content temporary displaying window 84 is temporarily displayed so as to be overlapped with the display of the key input area 58 when one second elapses from the touch of the "A" line character input key. Furthermore, the stored content temporary displaying window 84 is temporarily displayed so as to prevent the display of the "A" line character input key from being hidden.

Thus, the user can insert the temporarily stored character string after previously confirming the temporarily stored character string.

When the stored content temporary displaying window 84 is temporarily displayed, and a released is performed, it is erased. For example, when a touch is performed within the display coordinates of the "A" line character input key for one second or more, the stored content temporary displaying window 84 is temporarily displayed. Thereafter, when a release is performed at an arbitrary position, the temporary display of the stored content temporary displaying window 84 is erased. Even if the release is performed at the display coordinates of the "A" line character input key in a state that the stored content temporary displaying window 84 is temporarily displayed, the character of "A" line is not input.

Here, when the character string temporarily stored is inserted into the text of the reply mail, the temporary display of the stored content temporary displaying window 84 may be erased. For example, after the stored content temporary displaying window 84 is temporarily displayed, when a touch end is designated at the display coordinates of a certain character of the text of the reply mail, the character string temporarily stored is inserted into the text of the reply mail, and then, the temporary display of the stored content temporary displaying window 84 is erased.

Alternatively, in a case that touched coordinates on the touch panel input device 24 is constantly monitored, and the coordinates of the touch end and the coordinates of the touch start are different, the temporary display of the stored content temporary displaying window 84 may be erased. Furthermore, in a case that the coordinates of the current touched position on the touch panel input device 24 is moved to outside the display coordinates of the character input key, the temporary display of the stored content temporary displaying window 84 may be erased, or in a case that it is moved from the key input area 58 to the function displaying area 56, the temporary display of the stored content temporary displaying window 84 may be erased.

Then, in a case that a release is performed at a position other than the display coordinates of the keys with the key input area 58 within one second from a touch of the display coordinates of the "A" line character as shown in FIG. 10(B), the temporary display of the stored content temporary displaying window 84 is maintained. In this case, in order to erase the temporary display of the stored content temporary displaying window 84, a touch operation is performed on a "X" mark at the upper right of the stored content temporary displaying window 84 to erase the temporary display. Here, even when a touch operation is made at a position except for the display coordinates of the stored content temporary displaying window 84, the temporary display may be erased.

An explanation is made on a case that the character string temporarily stored is erased here. For example, in a case that the character string of "2/8" temporarily stored is erased, with reference to FIG. 10(A), a release is performed at the display coordinates of the erase key 84a after the stored content temporary displaying window 84 is temporarily displayed, the character string data temporarily stored is erased. That is, after the temporary display of the stored content temporary displaying window 84 is maintained, when a touch operation is performed at the display coordinates of the erase key 84a, the character string data temporarily stored is erased.

In addition, in a case that the user inputs a character in the "A" line, he or she touches the display coordinates of the "A" line character input key and releases it within one second from the touch. On the other hand, in a case that the content of the character string that is stored by being brought into correspondence with the "A" line character input key is confirmed, the user continues to touch the display coordinates of the "A" line character input key for one second or more. Here, the one second being a threshold value may be arbitrarily changed, and two seconds or more, or a time less than one second may be appropriate. Accordingly, the character input function can be consistent with the character temporary storing function.

Figure 11:
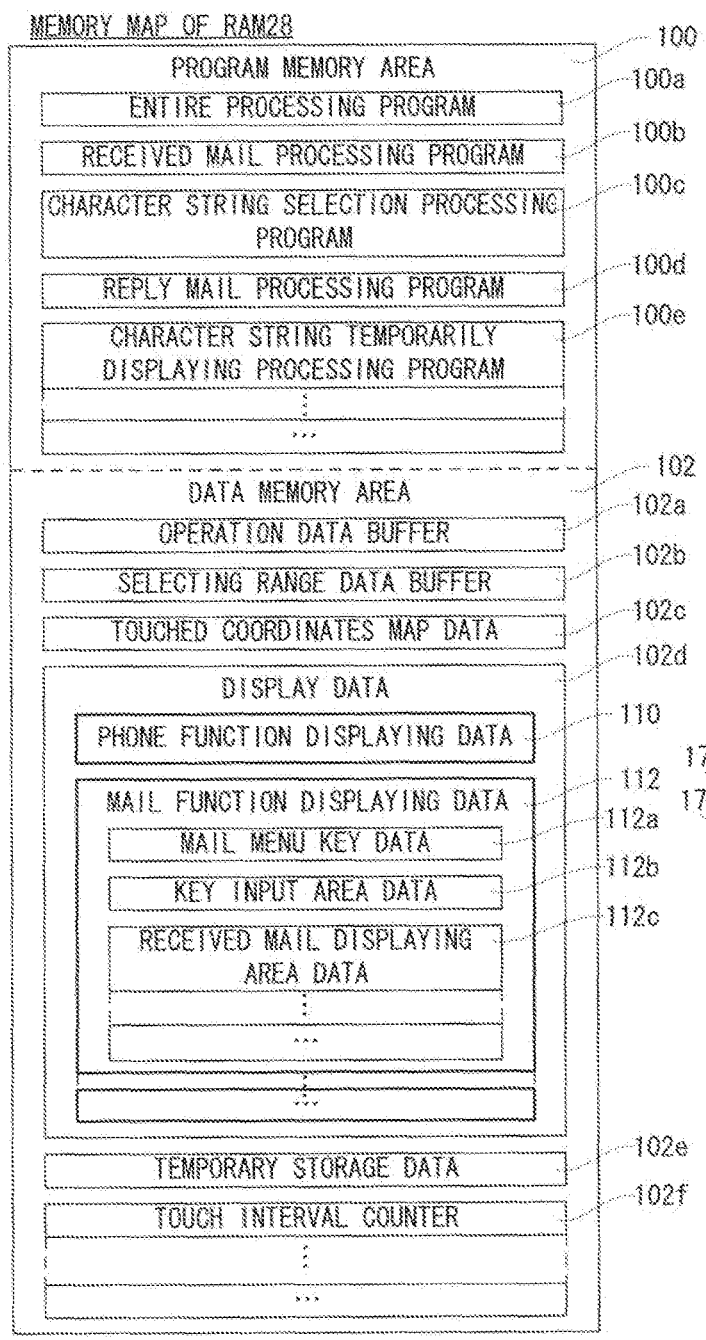
FIG. 11 is an illustrative view showing one example of a memory map of a RAM shown in FIG. 1 of the invention of the first embodiment.

FIG. 11 is an illustrative view showing a memory map of the RAM 28. Referring to FIG. 11, in the memory map of the RAM 28, a program memory area 100 and a data memory area 102 are included. A part of the program and data are read entirely at a time, or partially and sequentially as required from the flash memory 26, stored in the RAM 28, and processed by the CPU 20, etc.

The program memory area 100 stores a program for operating the mobile terminal 10. The program for working the mobile terminal 10 is made up of an entire processing program 100a, a received mail processing program 100b, a character string selection processing program 100c, a reply mail processing program 100d, a character string temporarily displaying processing program 100e, etc. The entire processing program 100a is a program for executing functions of the mobile terminal 10, such as a phone function, a mail function, etc.

The received mail processing program 100b is a program for performing a touch operation executed during the display of the received mail, and processes an operation of temporarily storing a selected character string, etc. The character string selection processing program 100c is a subroutine for the received mail processing program 100b, and is a program to be executed when an operation of selecting the character string of the text is performed in the received mail. The reply mail processing program 100d is a program for processing an operation while the reply mail is displayed, and processes an operation of inserting a character string temporarily stored into the text of the reply mail, for example. The character string temporarily displaying processing program 100e is a program for executing processing of temporarily displaying the character string temporarily stored in order to make the user confirm it on the LCD monitor 32. Although illustration is omitted, the program for working the mobile terminal 10 includes a program of making a phone call and a program of sending a created reply mail.

In a data memory area 102, an operation data buffer 102a and a selecting range data buffer 102b are provided. Furthermore, in the data memory area 102, touched coordinate map data 102c, display data 102d and temporary storage data 102e, and a touch interval counter 102f are provided.

The operation data buffer 102a is a buffer for temporarily storing an operation result of the touch panel input device 24, and stores coordinates of the touch start and the touch end, for example. The selecting range data buffer 102b is for, when processing of selecting a character string is executed, storing the display coordinates of the selected character string and the character string data.

The touched coordinate map data 102c is data for bringing an operation performed on the touch panel input device 24, for example, a position designated by the touch start into correspondence with the display coordinates of the LCD monitor 32. That is, the CPU 20 can bring the result of the operation performed on the touch panel input device 24 into correspondence with the display of the LCD monitor 32 on the basis of the touched coordinate map data 102c.

The display data 102d is data of images and character strings to be displayed on the LCD monitor 32 for each function of the mobile terminal 10. For example, in the display data 102d, phone function displaying data 110, mail function displaying data 112, etc. are included. The phone function displaying data 110 includes data of the input keys 60 for the phone function that are displayed in the key input area 58 shown in the display example in FIG. 3(C).

The mail function displaying data 112 is made up of mail menu key data 112a, key input area data 112b, received mail displaying area data 112c, etc. The mail menu key data 112a is data of respective keys included in the mail menu screen shown in FIG. 4(A), etc. The key input area data 112b is data of the input keys 80 for the mail function in the key input area 58 as shown in FIG. 4(B), etc. The received mail displaying area data 112c is made up of character string data, etc. included in a text of a received mail.

The temporary storage data 102e is data of a character string temporarily stored, etc. The touch interval counter 102f is a counter for counting a time from a touch start is designated.

Although illustration is omitted, in the data memory area 100, data of the address book, etc. and other counters and flags necessary for working the mobile terminal 10 are provided.

Figure 12:
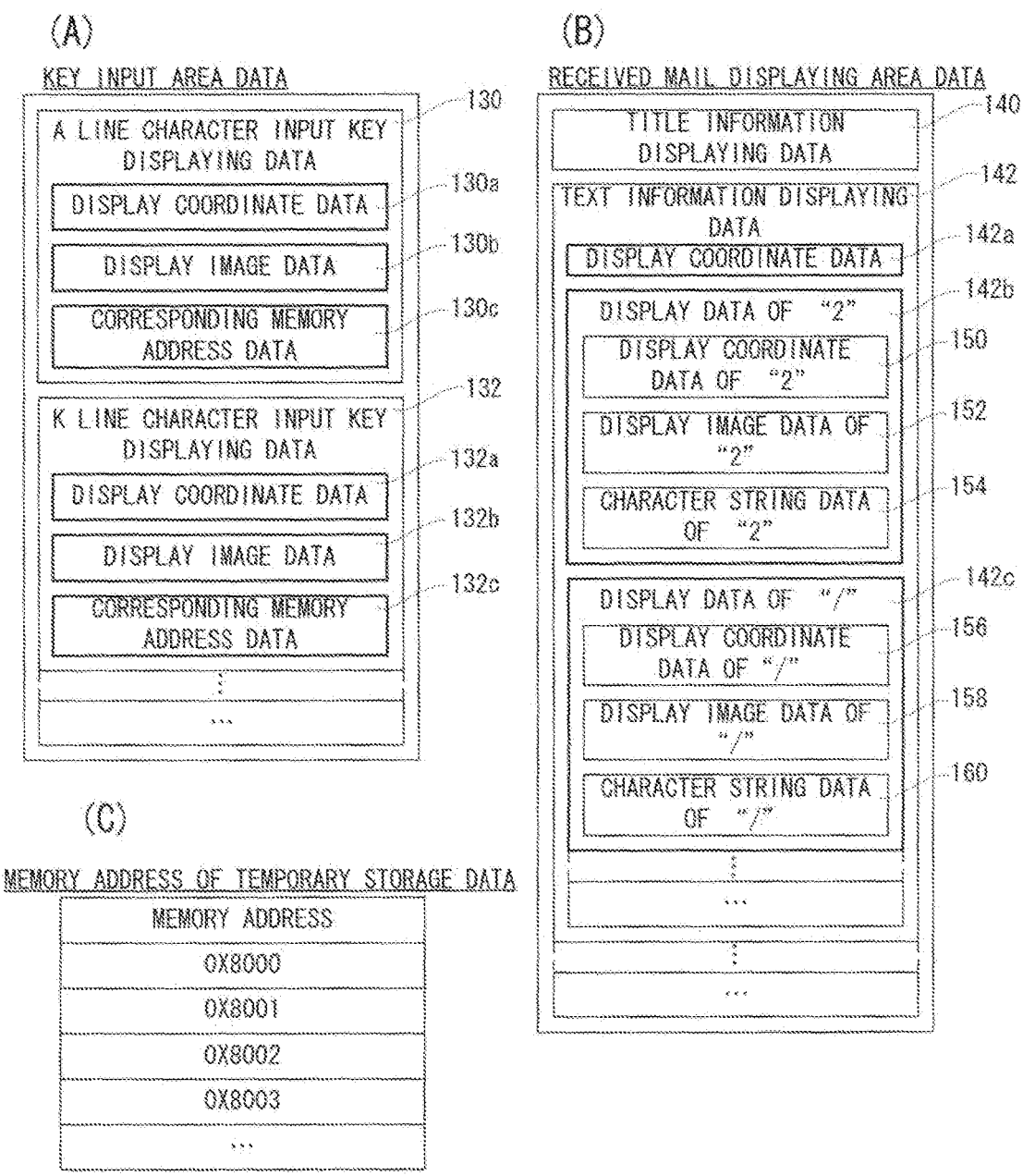
FIG. 12 is an illustrative view showing a detail of the data stored in the RAM shown in FIG. 11 of the invention of the first embodiment.

Referring to FIG. 12(A), the key input area data 112b is made up of "A" line character input key displaying data 130, "K" line character input key displaying data 132, etc. The "A" line character input key displaying data 130 is display data of the "A" line character input key as, shown in FIG. 4(B), etc, and the "A" line character input key displaying data 130 is further made up of display coordinate data 130a, display image data 130b, and corresponding memory address data 130c.

The display coordinate data 130a is data of display coordinates, such as the coordinates VKx1, coordinates VKx2, the coordinates VKy1 and the coordinates VKy2 as shown in FIG. 7. The display image data 130b is image (design) data necessary for displaying the "A" line character input key, and an image indicating "A" in hiragana characters. The corresponding memory address data 130c is data indicating a memory address in the temporary storage data 102e as shown in FIG. 12(C).

The "K" line character input key displaying data 132 is display data of the "K" line character input key shown in FIG. 4(B), etc. Then, each of display coordinate data 132a, display image data 132b and corresponding memory address data 132c making up of the data of "K" line character input key displaying data 132 is the same in configuration as the "A" line character input key displaying data 130, and the detailed explanation is omitted.

FIG. 12(B) is an illustrative view showing data structure of the received mail displaying area data 112c. Referring to FIG. 12(B), the display area data 112c is made up of title information displaying data 140, text information displaying data 142, etc. The title information displaying data 140 is data of a character string and display coordinates necessary for displaying a title of a received mail. The text coordinates data 142 is data of character strings and display coordinates necessary for displaying a text of a received mail, and is made up of display coordinate data 142a, display data of "2" 142b, display data of "/" 142c, etc.

The display coordinate data 142a is display coordinates data for displaying a text of a received mail. The display data of "2" 142b is data for displaying the character "2", and is made up of display coordinate data of "2" 150 indicating a display position of "2", display image data of "2" 152 being an image representing "2", and character string data of "2" 154 being data as a character string indicating "2". The display data of "/" 142c is data displaying the character "/", and has the same structure as the display data of "2" 142b, and therefore, the detailed explanation is omitted. Here, in the display coordinates of the text of the received mail shown in the display coordinate data 142a includes the display coordinate data of "2" 150 and display coordinate data of "/" 156 are included.

FIG. 12(C) is an illustrative view showing a memory address of the temporary storage data 102e. Referring to FIG. 12(C), the memory address of the temporary storage data 102e is 0X8000, 0X8001, 0X8002, X8003, . . . , etc., and in a memory area indicated by each memory address, character string data to be temporarily stored is stored.

Then, the display data of each character input key has a memory address of the temporary storage data 102e as a corresponding memory address data to thereby bring each memory address of the temporary storage data 102e into correspondence with each character input key. For example, the 0X8000 is stored as corresponding memory address data 130c of the "A" line character input key. Furthermore, the 0X8001 is stored as corresponding memory address data 132c of the "K" line character input key.

Figure 13:
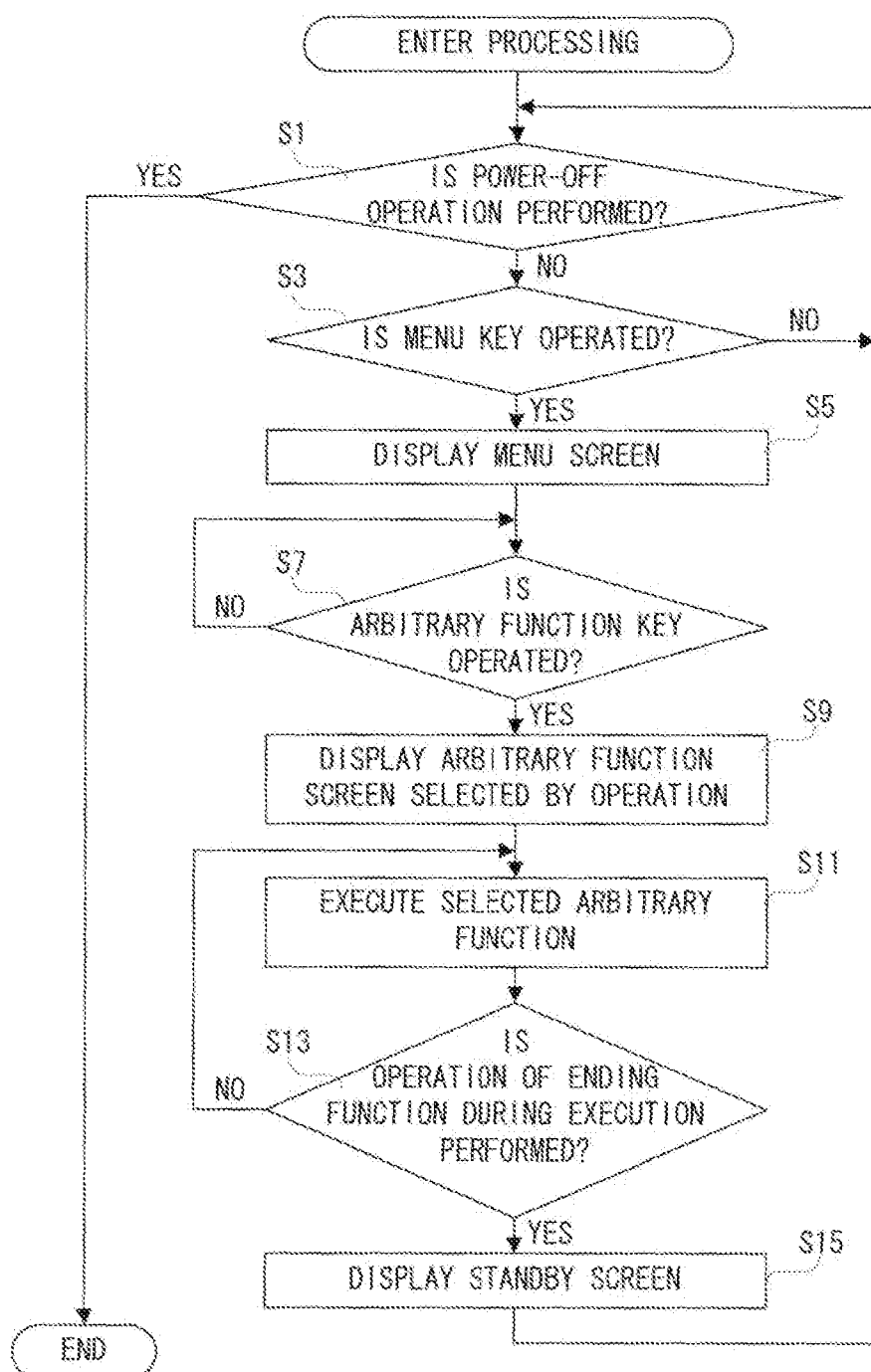
FIG. 13 is an illustrative view showing an entire processing program to be executed by the CPU of the mobile terminal in FIG. 1 of the invention of the first embodiment.
Figure 14:
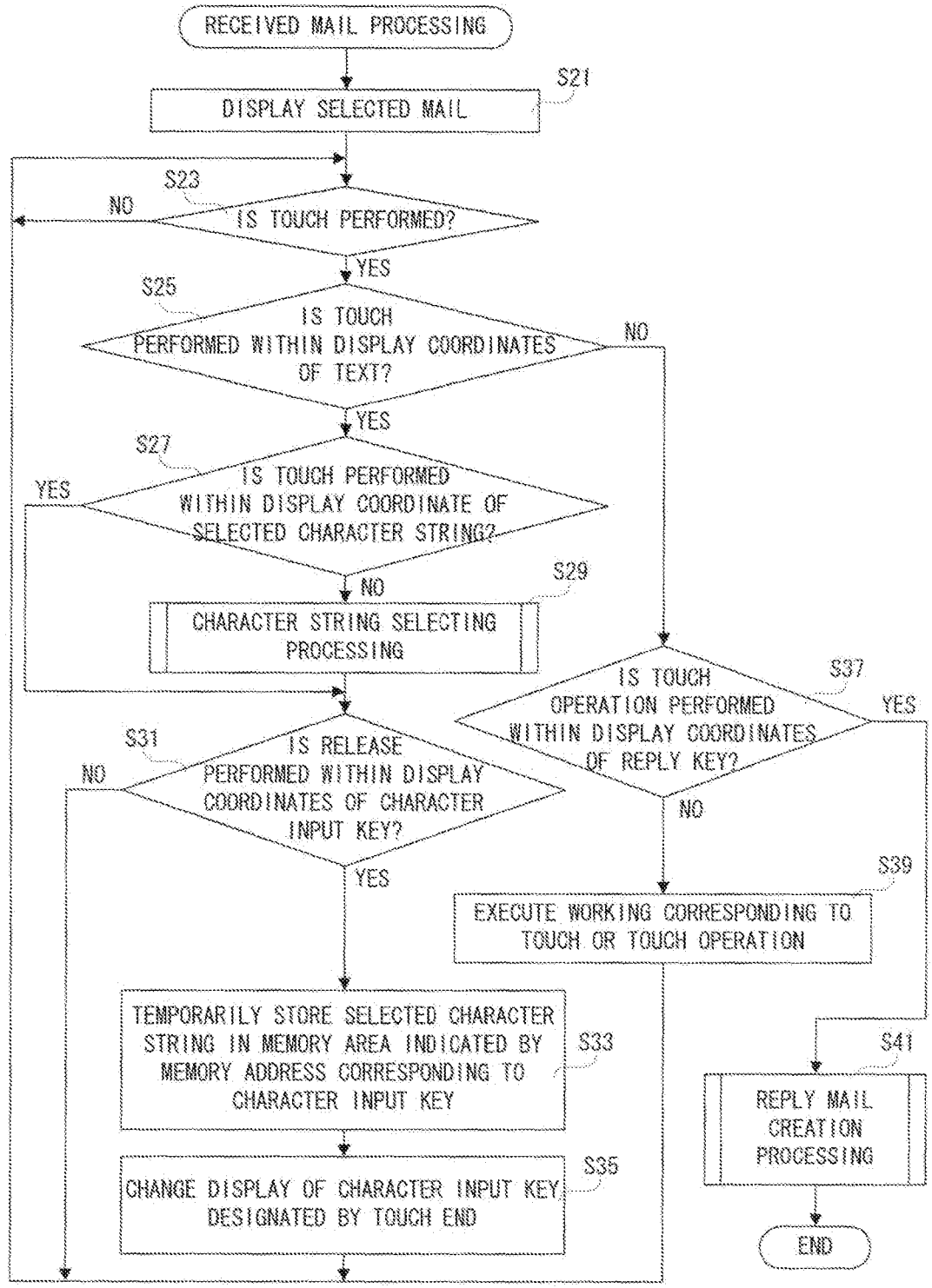
FIG. 14 is an illustrative view showing received mail processing program to be executed by the CPU of the mobile terminal in FIG. 1 of the invention of the first embodiment.
Figure 15:
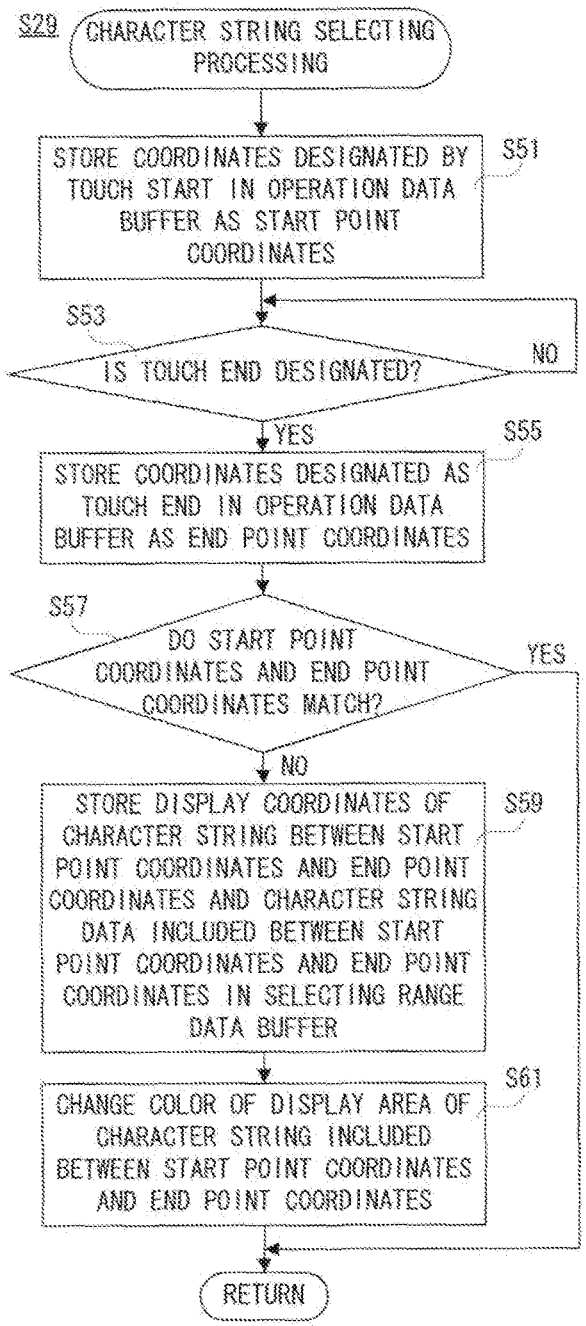
FIG. 15 is an illustrative view showing character string selection processing program to be executed by the CPU of the mobile terminal in FIG. 1 of the invention of the first embodiment.
Figure 17:
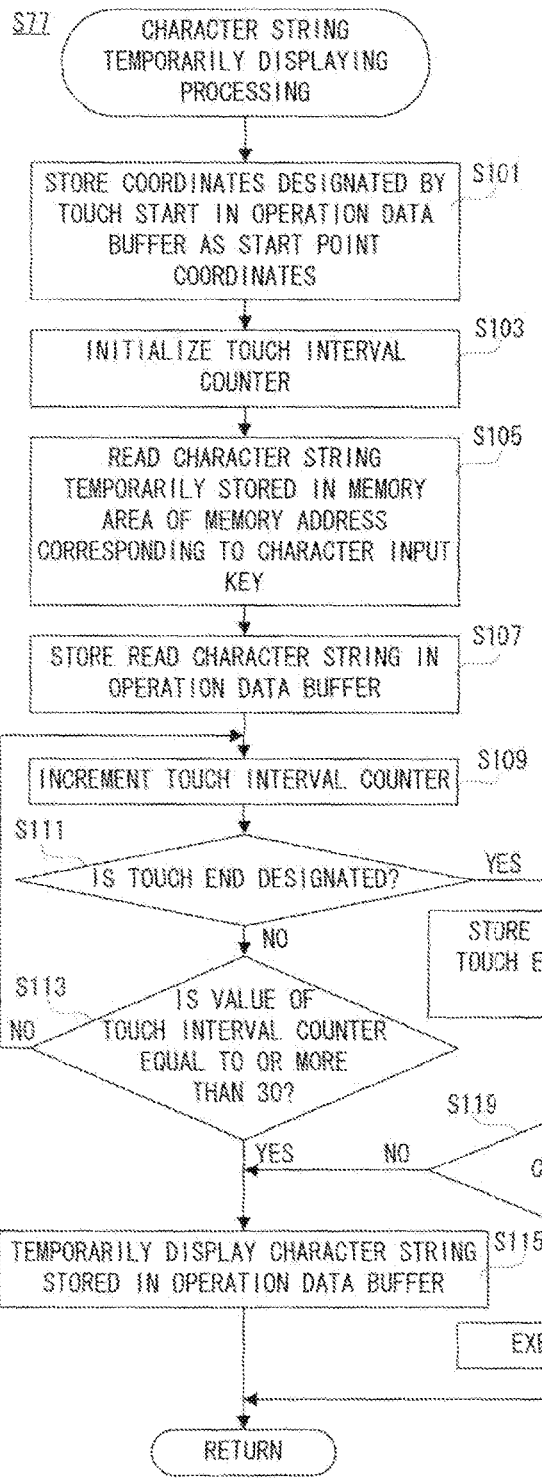
FIG. 17 is an illustrative view showing a character string display processing program to be executed by the CPU of the mobile terminal in FIG. 1 of the invention of the first embodiment.

The CPU 20 executes tasks including entire processing shown in FIG. 13, received mail processing shown in FIG. 14, character string selecting processing shown in FIG. 15, reply mail processing shown in FIG. 16 and character string temporarily displaying processing FIG. 17, etc. in parallel.

FIG. 13 is a flowchart showing the entire processing. Referring to FIG. 13, in a step S1, it is determined whether or not a power-off operation is performed. For example, it is determined whether or not the talk key 22c is operated with the power of the mobile terminal 10 turned on. If "YES" in the step S1, that is, if a power-off operation is performed, the entire processing is ended to make the power of the mobile terminal 10 off. On the other hand, if "NO" in the step S1, that is, if a power-off operation is not performed, it is determined whether or not the menu key 22b is operated in a step S3. If "NO" in the step S3, the process returns to the step S1 while if "YES" in the step S3, the menu screen is displayed in a step S5. For example, the CPU 20 displays the display example shown in FIG. 3(B) on the LCD monitor 32.

Succeedingly, in a step S7, it is determined whether or not the arbitrary function key is operated. That is, it is determined whether or not any one of the phone function key 44, the address book function key 46, the mail function key 48, the browser function key 50, the data folder function key 52, the tool function key 54, etc. that are displayed on the menu screen is operated. If "NO" in the step S7, that is, if no function key is operated, the determination in the step S7 is repeated. On the other hand, if "YES" in the step S7, that is, if a touch operation is performed on the arbitrary function key, an arbitrary function screen selected by the operation is displayed in a step S9. If a touch operation is performed on the mail function key 48, for example, the mail menu screen shown in FIG. 4(A) is displayed on the LCD monitor 32.

Successively, in a step S11, the selected arbitrary function is executed. For example, as to the mail function, processing of waiting for a key operation on the mail menu screen is executed, or processing of displaying a received mail in response to a touch operation on the in-box key 72, etc. on the mail menu screen is executed. Then, in a step S13, it is determined whether or not an operation of ending the function during execution is performed. If the talk end key 22c is operated, the function during execution is ended.

If "NO" in the step S13, the process returns to the step S11 while if "YES" in the step S13, a standby screen is displayed in a step S15. That is, the standby screen shown in FIG. 3(A) is displayed on the LCD monitor 32. Then, after completion of the processing in the step S15, the process returns to the step S1.

FIG. 14 is a flowchart showing the received mail processing. Referring to FIG. 14, in a step S21, a selected mail is displayed. That is, the received mail selected via a GUI (Graphical User Interface) for selecting the received mail not shown is displayed through the processing in the step S21. In a step S23, it is determined whether or not a touch is performed. That is, it is determined whether or not the touch panel input device 24 is touched. If "NO" in the step S23, that is, if not touched, the determination in the step S23 is repeated. On the other hand, if "YES" in the step S23, that is, if touched, a touch is performed within the display coordinates of the text in a step S25. That is, it is determined whether or not the position designated as a touch start by a touch is included in the range where the text of the received mail is displayed.

If "YES" in the step S25, that is, if a touch is performed in the range where the text of the received mail is displayed, it is determined whether or not the touch is performed within the display coordinates of the selected character string in a step S27. That is, it is determined whether or not the coordinates designated as a touch start by a touch is included in the display coordinates of the selected character string.

If "NO" in the step S27, that is, if the touch is not performed within the display coordinates of the selected character string, the character string selecting processing (see FIG. 15) is executed in a step S29. Furthermore, with respect to the character string selecting processing, the description will be made later, and therefore, the detailed description is omitted here. Here, the CPU 20 executing the processing in the step S29 functions as a selector.

Alternatively, if "YES" in the step S27, that is, if the touch is performed within the display coordinates of the selected character string, a release is performed within the display coordinates of the character input key in a step S31. For example, it is determined whether or not a release is performed within the display coordinates of the "A" line character input key. If "YES" in the step S31, that is, if a release is performed within the display coordinates of the arbitrary character input key, the selected character string is temporarily stored in the memory area indicated by the memory address corresponding to the character input key in step S33. For example, if the release is performed at the display area of the "A" line character input key corresponding to the memory address 0X8000 (see FIG. 12(C)) of the temporary storage data 102e, data of the character string of "2/8" is temporarily stored in the memory area indicated by the 0X8000. More specifically, the character string data of the selected character string of "2/8" is stored in the selecting range data buffer 102b, and therefore, in the memory area indicated by the memory address 0X8000, the character string data stored in the selecting range data buffer 102b is temporarily stored. If the character string is not selected, that is, if the character string data is not stored in the selecting range data buffer 102b, the character string data is not temporarily stored in the temporary storage data 102e. Here, the CPU 20 executing the processing in the step S33 functions as a storager.

Successively, in a step S35, the display of the character input key designated as a touch end is changed. For example, the display color of the "A" line character input key is changed as shown in FIG. 5(C). Here, if the character string data is not temporarily stored in the processing in the step S33, the display of the character input key is not changed. Then, after completion of the processing in the step S35, the process returns to the step S23. Alternatively, if "NO" in the step S31, that is, even if a touch end is not designated within the display coordinates of the arbitrary character input key as well, the process returns to the step S23. Here, the CPU 20 executing the processing in the step S35 functions as a display condition changer.

If "NO" in the step S25 here, that is, if a touch is not performed within the display coordinates of the text of the received mail, it is determined whether or not the touch operation is performed within the display coordinates of the reply key in a step S37. That is, it is determined whether or not the touch start and the touch end are designated within the display coordinates of the reply key. If "NO" in the step S37, a working corresponding to a touch or a touch operation is executed in a step S39, and the process returns to the step S23. For example, if a touch operation is performed within the display coordinates of the menu key for the mail function, the menu function screen for mail function is displayed.

Alternatively, if "YES" in the step S37, that is, if the touch operation is performed within the display coordinates of the reply key, the reply mail processing is executed in a step S41, and the received mail processing is ended.

FIG. 15 is a flowchart showing character string selecting processing shown in the step S29 (see FIG. 14). Referring to FIG. 15, in a step S51, the coordinates designated as a touch start are stored in the operation data buffer 102a as start point coordinates. Successively, in a step S53, it is determined whether or not a touch end is designated. That is, it is determined whether or not a release is performed in a selecting range of the character string. If "NO" in the step S53, that is, if a touch end is not designated, the determination in the step S53 is repeated. On the other hand, if "YES" in the step S53, the coordinates designated as a touch end are stored in the operation data buffer 102a as end point coordinates in a step S55.

In a step S57, it is determined whether or not the start point coordinates and the end point coordinates match. That is, it is determined whether or not the touch end is designated at a position different from the touch start. If "NO" in the step S57, that is, if the start point coordinates and the end point coordinates do not match, the display coordinates of the character string included between the start point coordinates and the end point coordinates and the character string data included between the start point coordinates and the end point coordinates are stored in the selecting range data buffer 102b in a step S59. Here, the CPU 20 executing the processing in the step S59 functions as a selecting area decider.

Successively, in a step S61, the color of the display area of the character string included between the start point coordinates and the end point coordinates is changed. That is, in order to notify the user of the selected character string, the display color of the character string "2/8" is changed as shown in FIG. 5(A). Then, after completion of the processing in the step S61, the character string selecting processing is ended, and the process returns to the received mail processing (see FIG. 14). Even if "YES" in the step S57, the process returns to the received mail processing.

FIG. 16 is a flowchart showing the reply mail processing in the step S41 (see FIG. 14). Referring to FIG. 16, in a step S71, reply mail creating processing is executed. For example, in the mail address of the destination, a mail address of the sender of the received mail is input, in the title, a character string of the received mail inclusive of the character string of "RE" is input, and in the text, a reply mail into which the text of the received mail is inserted as a reference is created.

In a step S73, it is determined whether or not a touch is performed. If "NO" in the step S73, the determination in the step S73 is repeated. On the other hand, if "YES" in the step S73, it is determined whether or not the touch is performed within the display coordinates of the character input key in a step S75. For example, it is determined whether or not the touch is performed within the display coordinates of the "A" line character input key, etc. If "YES" in the step S75, that is, if the touch is performed within the display coordinates of the character input key, the character string temporarily displaying processing (see FIG. 17) is executed in order to temporarily display the character string temporarily stored in a step S77. As to the character string temporarily displaying processing, the description will be made later, and therefore, the detailed description is omitted here.

Successively, in a step S79, it is determined whether or not a release is performed. If "NO" in the step S79, that is, if a release is not performed, the determination in the step S79 is repeated. On the other hand, if "YES" in the step S79, it is determined whether or not the release is performed within the display coordinates of the text in a step S81. That is, it is determined whether or not the touch end designated by the release is designated within the display coordinates of the text of the received mail. If "YES" in the step S81, that is, if the release is performed within the display coordinates of the text of the received mail, the character string stored by being brought into correspondence with the character input key is inserted into the text of the received mail at the coordinates indicated by the touch end in a step S83. For example, the character string temporarily stored by being brought into correspondence with the "A" line character input key is inserted into the text of the reply mail according to the display coordinates of the character string indicated by the touch end. Here, the CPU 20 executing the processing in the step S83 functions as a displayer.

Alternatively, if "NO" in the step S81, that is, if the release is not performed within the display coordinates of the text of the received mail, it is determined whether or not the character string is temporarily displayed in a step S85. That is, it is determined whether or not the character string is temporarily displayed by the character string temporarily displaying processing in the step S77. If "YES" in the step S85, that is, if the character string temporarily stored is temporarily displayed, the character string that is temporarily displayed is erased in a step S87, and the process returns to the step S73. Even if "NO" in the step S85, the process returns to the step S73. Here, the CPU 20 executing the processing in the step S87 functions as a display eraser.

Here, if "NO" in the step S75, that is, if the touch is not performed within the display coordinates of the character input key, it is determined whether or not the touch operation is performed within the display coordinates of the send key in a step S89. That is, it is determined whether or not the touch start and the touch end are designated within the display coordinates of the send key. If "NO" in the step S89, a working corresponding to the touch or the touch operation is executed in a step S91, and the process returns to the step S73. For example, if the touch operation is performed within the display coordinates of the menu key, etc., the menu function screen is displayed on the LCD monitor 32. Alternatively, if "YES" in the step S89, that is, if the touch operation is performed within the display coordinates of the reply key, sending the mail is executed in a step S93 to end the reply mail processing.

FIG. 17 is a flowchart showing the character string temporarily displaying processing shown in the step S77 (see FIG. 16). Referring to FIG. 17, in a step S101, the coordinates designated as a touch start is stored in the operation data buffer 102a as start point coordinates. Successively, in a step S103, the touch interval counter 102f is initialized. That is, in order to count the time from the touch, the touch interval counter 102f is initialized. Successively, in a step S105, the character string stored in the memory area of the memory address corresponding to the character input key is read. If the character string of "2/8" is stored in the memory area of the memory address corresponding to the "A" line character input key, the character string of "2/8" is read. In a step S107, the read character string is stored in the operation data buffer 102a. That is, the character string of "2/8" is stored in the operation data buffer 102a.

Successively, in a step S109, the touch interval counter 102f is incremented. That is, the time from when the touch is performed is counted. Then, in a step S111, it is determined whether or not a touch end is designated. If "NO" in the step S111, that is, if a touch end is not designated, it is determined whether or not the value of the touch interval counter 102f is equal to or more than 30 in a step S113. That is, it is determined whether or not the time from the touch is above a predetermined time. If "NO" in the step S113, the process returns to the step S109. Here, the CPU 20 executing the processing in the step S109 and the step S113 functions as a time counter.

Furthermore, the steps from the step S109 to S113 is processed for 1/30 seconds, and therefore, if the value of touch interval counter 102f is 30, this means that one second elapses from the designation of the touch start. Thus, if "YES" in the step S113, that is, if the time from when the touch is performed is above one second, the character string stored in the operation data buffer 102a is temporarily displayed in a step S115. For example, as shown in FIG. 10(A), the character string of "2/8" is temporarily displayed on the basis of the coordinates indicated by the touch start. Then, after completion of the processing in the step S115, the character string temporarily displaying processing is ended, and the process returns to the reply mail processing (see FIG. 16). Here, the value decided in the step S113 may be arbitrarily set to a value equal to or more than 30 or a value less than 30. Furthermore, the CPU 20 executing the processing in the step S115 functions as a data displayer.

Here, if "YES" in the step S111, that is, if the time from when the touch is performed is within one second, the coordinates designated as a touch end is stored in the operation data buffer 102a as end point coordinates in a step S117. Succeedingly, in a step S119, it is determined whether or not the start point coordinates and the end point coordinates are included in the display coordinates of the same character input key. For example, it is determined whether or not the start point coordinates and the end point coordinates are included within the display coordinates of the "A" line character input key. If "YES" in the step S119, that is, if the start point coordinates and the end point coordinates are included within the display coordinates of the "A" line character input key, a working of the character input is executed in a step S121. That is, the working of inputting the "A" line character is executed. Then, after completion of the processing in the step S121, the character string temporarily displaying processing is ended, and the process returns to the reply mail processing (see FIG. 16).

Alternatively, if "NO" in the step S119, that is, if the end point coordinates are not included within the display coordinates of the character input key, and the start point coordinates and the end point coordinates do not match, the process proceeds to a step S115 to temporarily display the stored content temporary displaying window 84, then, the character string temporarily displaying processing is ended, and the process return to the reply mail processing (see FIG. 16).

As understood from the above description, the mobile terminal 10 selects a character string in a text in a received mail, etc. according to the positions designated by a touch start and a touch end. Then, when a touch start is designated within the display coordinates of the selected character string, and a touch end is designated within the display coordinates of an arbitrary character input key, the selected character string is temporarily stored in a memory area indicated by the memory address corresponding to the arbitrary character input key. Then, when a touch start is designated within the display coordinates of the character input key used for temporarily storing the character string, and a touch end is designated within the display coordinates of the text of the reply mail, etc., the character string temporarily stored can be inserted on the basis of the coordinates designated by the touch end.

Thus, the user can temporarily store the selected character string, and can easily insert the temporarily stored character string.

Second Embodiment

In the second embodiment shown in FIG. 18(A) to FIG. 18(C), a dedicated key to a temporary storage is provided. Furthermore, in the second embodiment, the configuration of the mobile terminal 10 shown in FIG. 1, the external view of the mobile terminal 10 shown in FIG. 2 and the display example of the LCD monitor 32 shown in FIG. 3 that are used for explaining the first embodiment are the same, and therefore, in the second embodiment, a redundant explanation is omitted.

Each of FIG. 18(A) to FIG. 18(C) shows a procedure of creating a temporary storage key 174 being a dedicated key for a temporary storage. FIG. 18(A) is a display example showing the content of a received mail on the LCD monitor 32, and displays a create key 170 and an erase key 172 in the function displaying area 56. Here, the key input area 58 is the same as that in FIG. 4(B), etc. explained in the first embodiment, and therefore, the detailed explanation is omitted. When a touch operation is performed on the create key 170 within the display coordinates, the temporary storage key 174 is newly displayed as shown in FIG. 18(B). The erase key 172 is a key for erasing the created temporary storage key 174. Furthermore, the detailed procedure for erasing the temporary storage key 174 will be described later, and therefore, the detailed explanation therefor is omitted here.

Referring to FIG. 18(B), when a touch operation is performed within the display coordinates of the create key 170, the temporary storage key 174 is displayed on the LCD monitor 32. In addition, the temporary storage key 174 is brought into correspondence with the memory address of the RAM 28. Then, when a touch and slide operation is performed from a display coordinates of a selected character string to the display coordinates of the temporary storage key 174 similar to the character input key of the first embodiment, the temporary storage key 174 temporarily stores the selected character string in the memory area indicated by the corresponding memory address.

Referring to FIG. 18(C), the range defined by coordinates VKy3 and coordinates VKy4 in the direction of the longitudinal axis and coordinates VKx3 and coordinates VKx4 in the direction of the lateral axis is a display coordinates of the temporary storage key 174 and a touch effective area. A central coordinates S of the temporary storage key 174 is defined by coordinates VKxS and coordinates VKyS. Furthermore, the configuration of each of the display coordinates in the create key 170 and the erase key 172 is similar to that in the storage key 174.

It should be noted that the temporary storage key 174 is displayed by one, but by further performing a touch operation on the create key 174, two or more temporary storage keys 174 can be created. Furthermore, in a case that a plurality of temporary storage keys 174 are created, the position of each of the temporary storage keys 174 can arbitrarily be changed. For example, if three temporary storage keys 174 are displayed, the temporary storage key 174 provided at the right end can be moved to the left end according to a touch and slid operation, etc.

Figure 20:
FIG. 20 is an illustrative view showing another part of the procedure of temporarily storing the character string of the invention of the second embodiment in the received mail received by the mobile terminal shown in FIG. 1.
Figure 19:
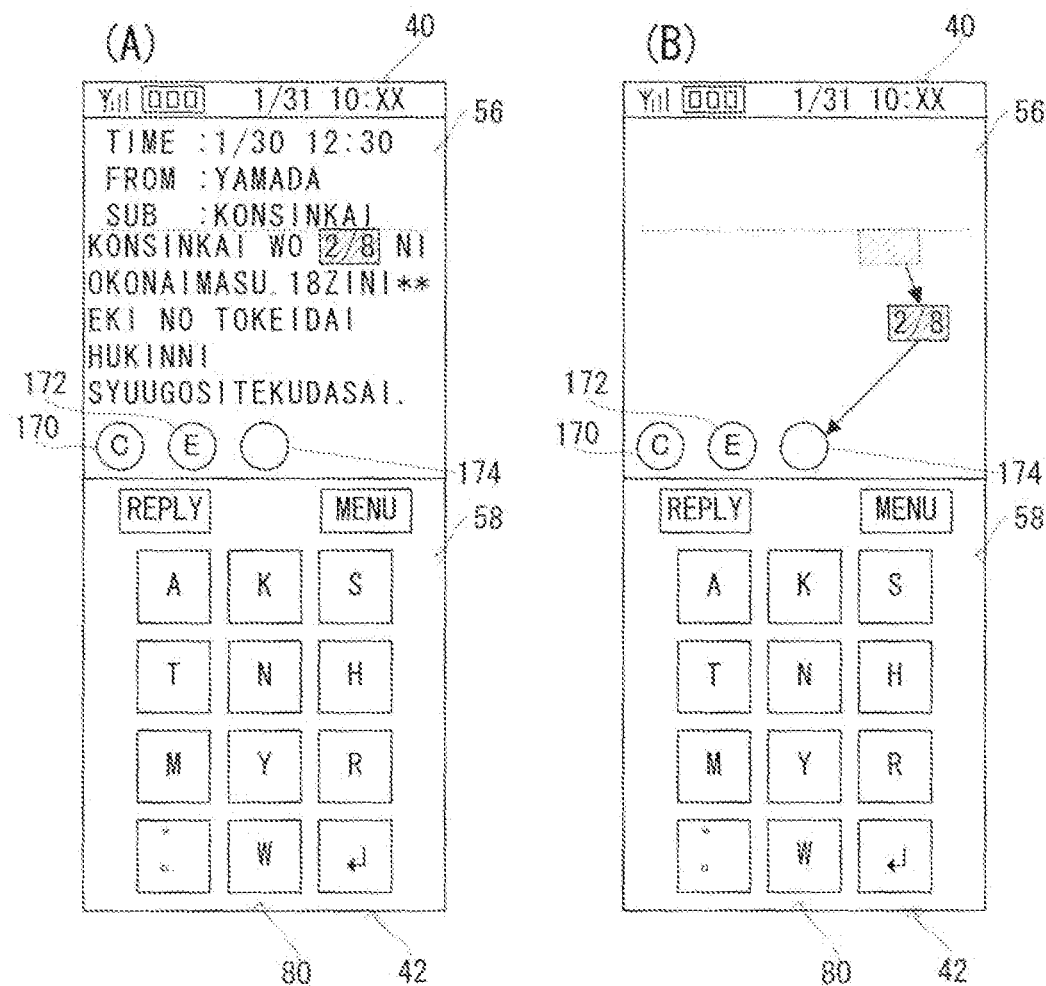
FIG. 19 is an illustrative view showing a part of procedure of temporarily storing a character string of the invention of the second embodiment in a received mail received by the mobile terminal shown in FIG. 1.

Each of FIG. 19(A), FIG. 19(B) and FIG. 20 is an illustrative view for explaining a procedure for temporarily storing a character string selected in the text of the received mail. Furthermore, selection of the character string is similar to that in the first embodiment, and therefore, the detailed explanation therefor is omitted here.

Referring to FIG. 19(A), in the text of the received mail, the character string of "2/8" is the selected character string. As shown in FIG. 19(B), when a touch start is designated within the display coordinates of the selected character string, and a touch end is designated within the display coordinates of the temporary storage key 174, the selected character string data is temporarily stored in the memory area indicated by the memory address corresponding to the temporary storage key 174. That is, when a touch and slide operation is performed from the character string of "2/8" to the temporary storage key 174, the character string data of "2/8" is temporarily stored in the memory area indicated by the memory address corresponding to the temporary storage key 174. Then, when the character string is temporarily stored in the memory area indicated by the memory address corresponding to the temporary storage key 174, the display color of the temporary storage key 174 is changed as shown in FIG. 20.

Here, when a touch and slide operation is performed from the selected character string to the create key 170 as well, the temporary storage key 174 may be created. In addition, the selected character string is temporarily stored in the memory area indicated by the memory address corresponding to the temporary storage key 174.

Figure 22:
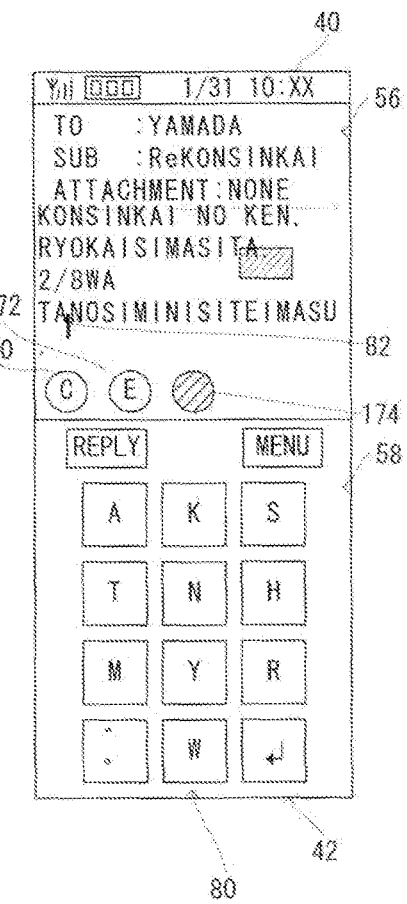
FIG. 22 is an illustrative view showing another part of the procedure of inserting the character string temporarily stored in FIG. 20 into the text of the reply mail.
Figure 21:
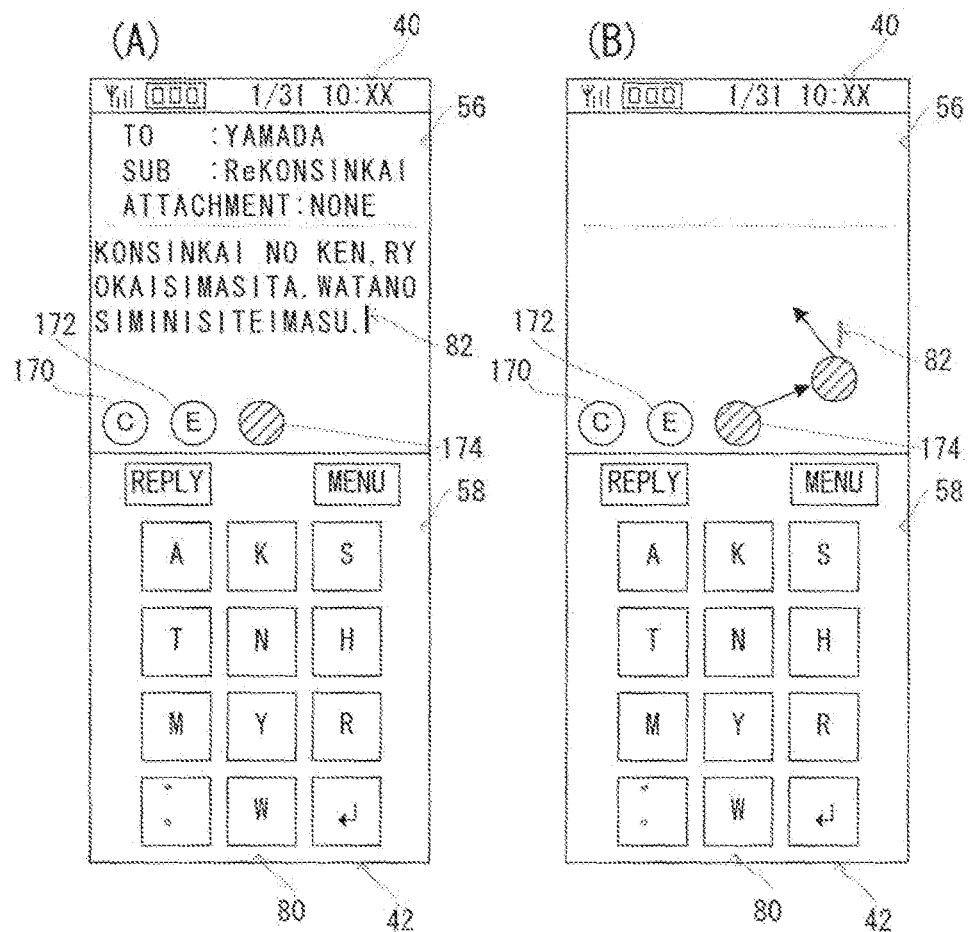
FIG. 21 is an illustrative view showing a part of a procedure of inserting the character string temporarily stored in FIG. 20 into a text of a reply mail.

Each of FIG. 21(A), FIG. 21(B) and FIG. 22 is an illustrative view explaining a procedure of inserting the temporarily stored character string into the text of the reply mail. Referring to FIG. 21(A), in the function displaying area 56, the text of the reply mail, etc. is displayed, and the create key 170, the erase key 172, the temporary storage key 174, etc. are further displayed. As shown in FIG. 21(B), if a touch start is designated within the display coordinates of the temporary storage key 174, and a touch end is designated within the display coordinates of the text of the reply mail, the character storing temporarily stored is inserted into the position designated by the touch end. For example, as shown in FIG. 22, the character string of "2/8" is inserted into the text of the reply mail.

Figure 23:
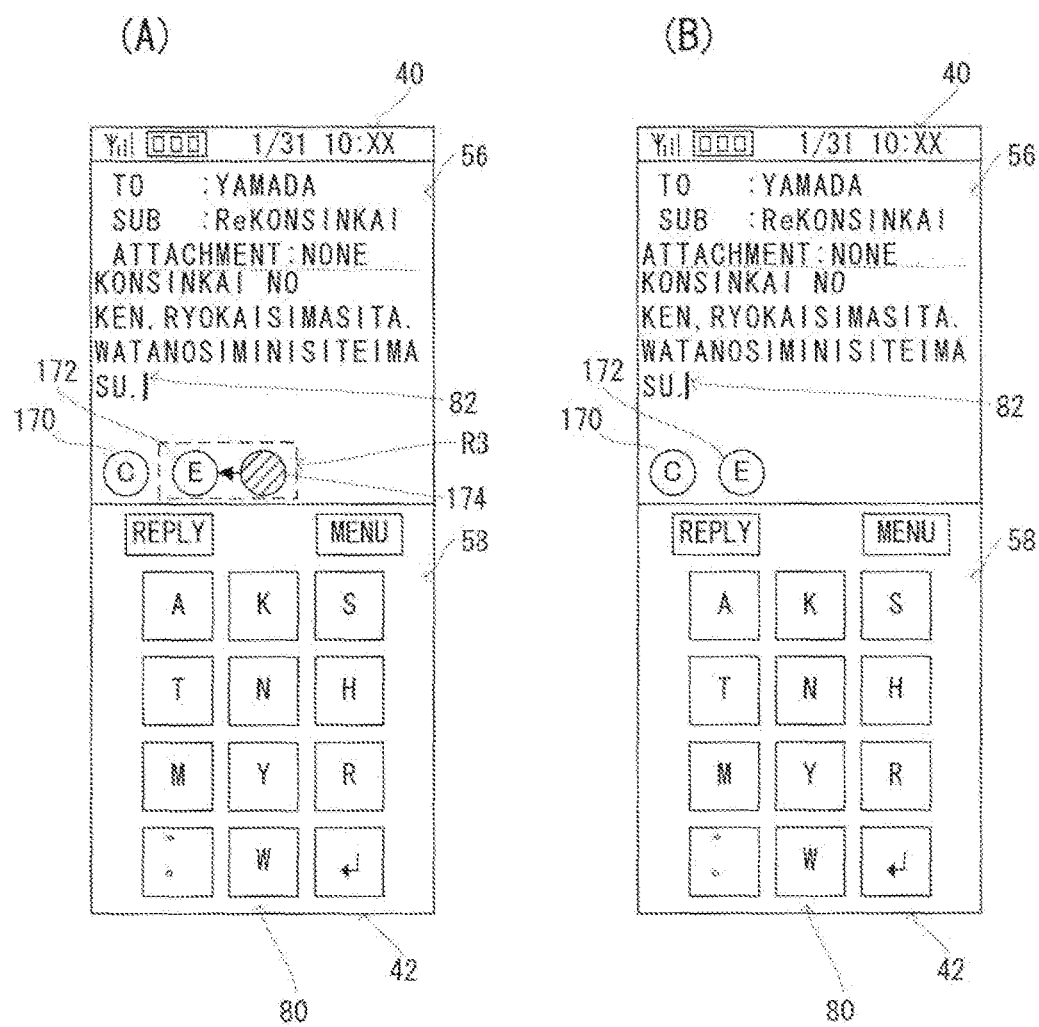
FIG. 23 is an illustrative view showing a procedure of erasing a temporary storage key shown in FIG. 18.

Each of FIG. 23(A) and FIG. 23(B) is an illustrative view showing a procedure of erasing the temporary storage key 174. Referring to FIG. 23(A), if a touch start is designated within the display coordinates of the temporary storage key 174 and a touch end is designated within the display coordinates of the erase key 172, the temporary storage key 174 is deleted as shown in FIG. 23(B). That is, when a touch and slide operation is performed from the temporary storage key 174 to the erase key 172, the temporary storage key 174 is deleted. Furthermore, when the temporary storage key 174 is deleted, the memory address that is brought into correspondence with the temporary storage key 174 is canceled.

Figure 24:
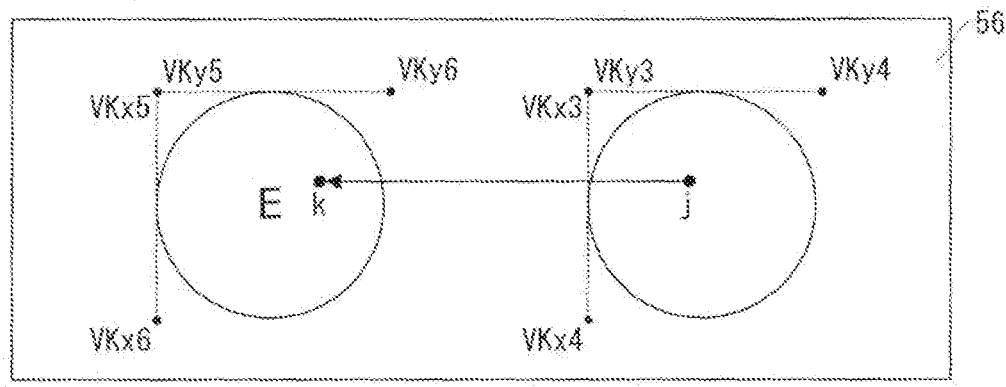
FIG. 24 is an illustrative view showing the procedure of erasing the temporary storage key shown in FIG. 18 in detail.

A procedure of erasing the temporary storage key 174 is explained in detail by using FIG. 24 here. FIG. 24 is a schematic view showing an area R3 in FIG. 23(A) in an enlarged manner. Referring to FIG. 24, the range defined by coordinates VKx5 and coordinates VKx6 in the direction of the longitudinal axis and by coordinates VKy5 and coordinates VKy6 in the direction of the lateral axis is a display coordinates of the erase key 172, and a touch effective area. Here, a central coordinates of the erase key 172 is omitted here for simplicity.

The coordinates indicated by a point j is included within the display coordinates of the temporary storage key 174 in FIG. 18(C) as well, and a coordinates indicated by a point k is included within the display coordinates of the erase key 172. In a case that the point j is designated as a touch start, and the point k is designated as a touch end, that is, if sliding is performed from the point j to the point k, the display of the temporary storage key 174 is erased as shown in FIG. 23(B).

Here, if two or more temporary storage keys 174 are displayed, by performing a touch and slide operation from one temporary storage key 174 to another temporary storage key 174, the display of the other temporary storage key 174 is erased, and the data stored in the memory area indicated by the memory address corresponding to the other temporary storage key 174 may be erased. Furthermore, in this case, data stored in the memory area indicated by the memory address corresponding to the one temporary storage key 174 is overwritten with the memory area indicated by the memory address corresponding to the other temporary storage key 174, and the memory address corresponding to the other temporary storage key 174 may be brought into correspondence with the one temporary storage key 174.

Furthermore, in the second embodiment as well, similar to the first embodiment, the character string that is temporarily stored by being brought into correspondence with the temporary storage key 174 can be temporarily displayed. In the explanation in the second embodiment, although illustration is omitted, the stored content temporary displaying window 84 is temporarily displayed in the key input area 58. Furthermore, a temporary displaying procedure and a procedure of erasing the character string temporarily stored are similar to those in the first embodiment, and therefore, the detailed explanation is omitted.

Figure 25:
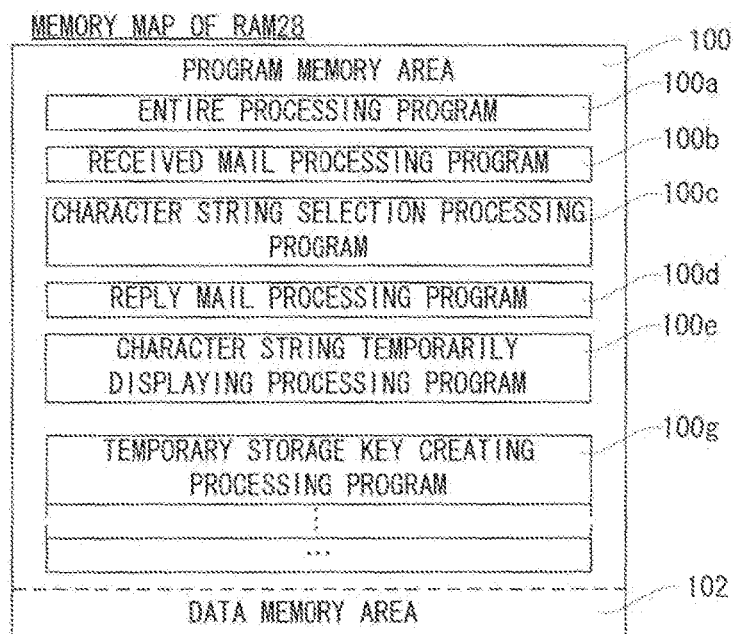
FIG. 25 is an illustrative view showing one example of a memory map of the RAM shown in FIG. 1 of the invention of the second embodiment.

FIG. 25 is an illustrative view showing a memory map of the RAM 28 of the second embodiment. As to the programs included in the program memory area, the entire processing program 100 and the character string selection processing program 100c are similar to the first embodiment, and as to the received mail processing program 100b and the reply mail processing program 100d, a key as an object for temporary storage is an arbitrary character input key in the first embodiment, but it is the temporary storage key 174 in the second embodiment. In addition, as to the character string temporarily displaying processing program 100e, the processing of executing character input operation shown in FIG. 17 is not performed. That is, in the character string temporarily displaying processing program 100e in the second embodiment, only the processing in the steps S105, S107, S115 are executed, and when a touch start is designated within the display coordinates of the temporary storage key 174, the character string is temporarily displayed.

The temporary storage key creation processing program 100g is a program executed when an operation of creating the temporary storage key 174 shown in FIG. 18(A) to FIG. 18(C) is performed.

FIG. 26 is an illustrative view showing the data memory area 102 in detail in the memory map of the RAM 28 shown in FIG. 25. Furthermore, the operation data buffer 102a, the selecting range data buffer 102b, the touched coordinate map data 102c, the temporary storage data 102c, and the touch interval counter 102f are the same as those in the first embodiment, and therefore, detailed explanations therefor are omitted. In addition, in the display data 102d, in addition to the phone function displaying data 110, the mail function displaying data 112, etc., temporary storage key displaying data 114 is further included.

The temporary storage key displaying data 114 is made up data of coordinates and images for displaying the create key 170, the erase key 172, and the temporary storage key 174 shown in FIG. 18(B), etc.

Then, in the data memory area 102, a temporary storage key flag 102g is stored in addition to the memory map of the first embodiment. The temporary storage key flag 102g is made up of a temporary storage key 1 flag 116, a temporary storage key 2 flag 118, etc. Furthermore, the temporary storage key 1 flag 116 is a flag for determining whether or not creation or erasure of the temporary storage key 174 is performed. For example, the temporary storage key 1 flag 116 is formed of one bit register. When a touch operation is performed on the create key 172 in a state that the temporary storage key 174 is not displayed, a data value of "1" is set to the register, and when a touch and slide operation is performed from the temporary storage key 174 to the erase key 172, a data value "0" is set to the register. In addition, the initial setting of the temporary storage key flag 116 is set to be turned off.

For example, if the temporary storage key 174 is created, the temporary storage key 1 flag 116 is in an on state, and if the temporary storage key 174 is erased, the temporary storage key 1 flag 116 is in an off state.

Additionally, the temporary storage key 2 flag 118 has a similar configuration to the temporary storage key 1 flag 116. That is, the temporary storage key 2 flag 118 sets a data value "1" to the register when a touch operation is performed on the create key 170 in a state that the temporary storage key 174 is displayed.

Figure 27:
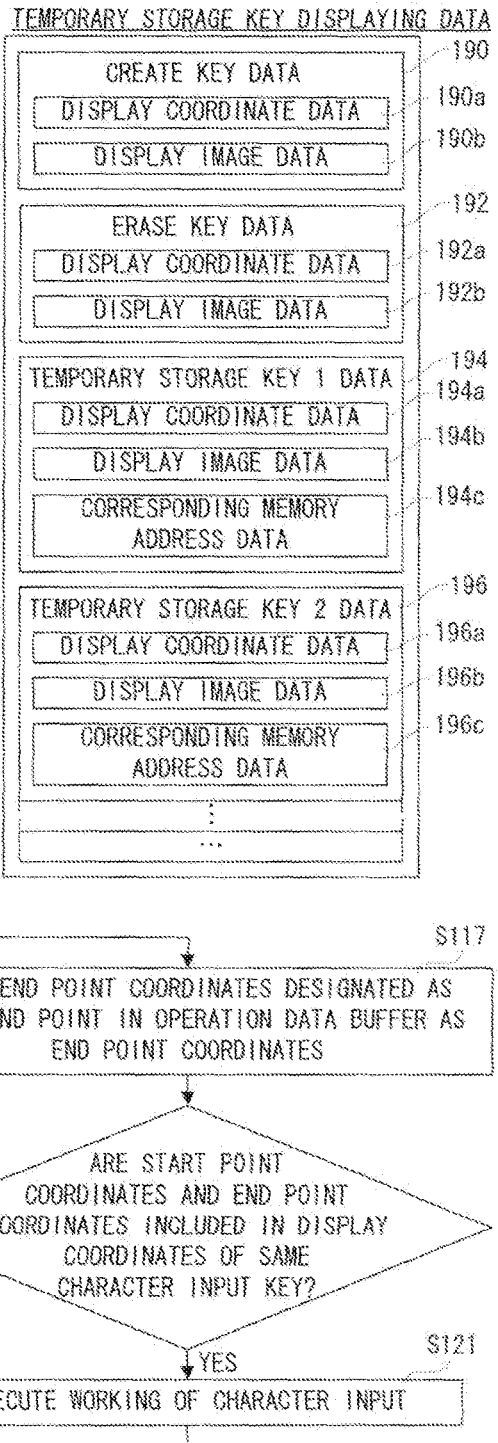
FIG. 27 is an illustrative view showing the detail of temporary storage data of the invention of the second embodiment.

FIG. 27 is an illustrative view showing data structure of the temporary storage key displaying data 114 in detail. Referring to FIG. 27, in the temporary storage key displaying data 114, create key data 190, erase key data 192, temporary storage key 1 data 194 and temporary storage key 2 data 196 are included. The create key data 190 is data for displaying the create key 170 (see FIG. 18(A)), and is further made up of display coordinate data 190a for indicating the display coordinates of the create key 170 and display image data 190b being an image necessary for displaying the create key 170. Furthermore, the erase key data 192 has data structure similar to that of the create key data 190, and therefore, detailed explanation is omitted.

The temporary storage key 1 data 194 is data for displaying the temporary storage key 174, and includes display coordinate data 194a, display image data 194b and corresponding memory address data 194c. The display coordinate data 194a is data of display coordinates shown in FIG. 18(C). The display image data 194b is image data for displaying the temporary storage key 174. The corresponding memory address data 194c is data of a memory address indicating the memory area of the temporary storage data 102e. For example, if the temporary storage key 1 flag 116 is in an on state, the memory address 0X8000 of the temporary storage data 102e shown in FIG. 12(C) is stored as corresponding memory address data 194c. On the other hand, if the temporary storage key 1 flag 116 is in an off state, NULL data indicating that no data is stored is stored as corresponding memory address data 194c.

Furthermore, the temporary storage key 2 data 196 has data structure similar to that of the temporary storage key 1 data 194.

Figure 28:
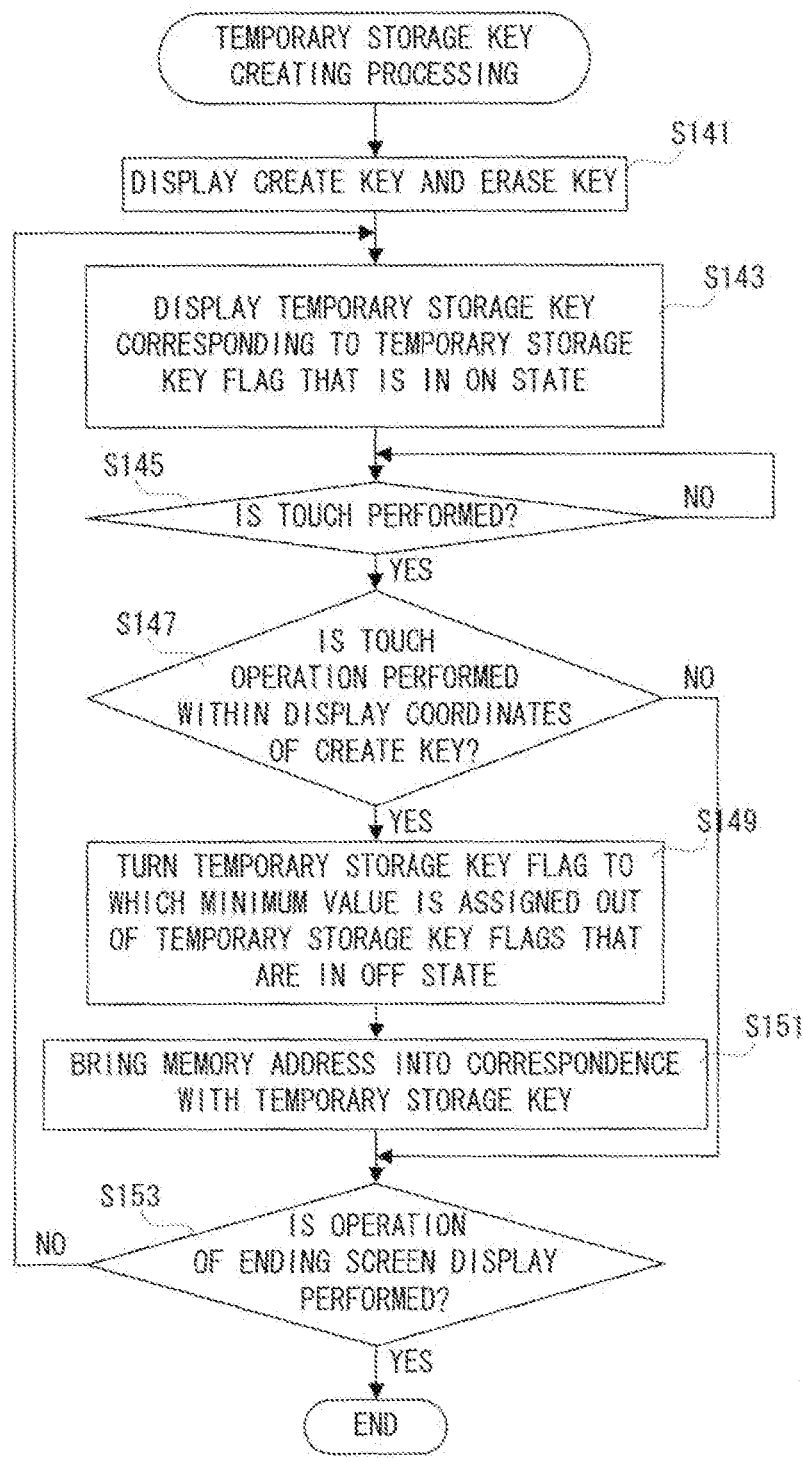
FIG. 28 is an illustrative view showing a temporary storage key creation processing program to be executed by the CPU of the mobile terminal in FIG. 1 of the invention of the second embodiment.
Figure 29:
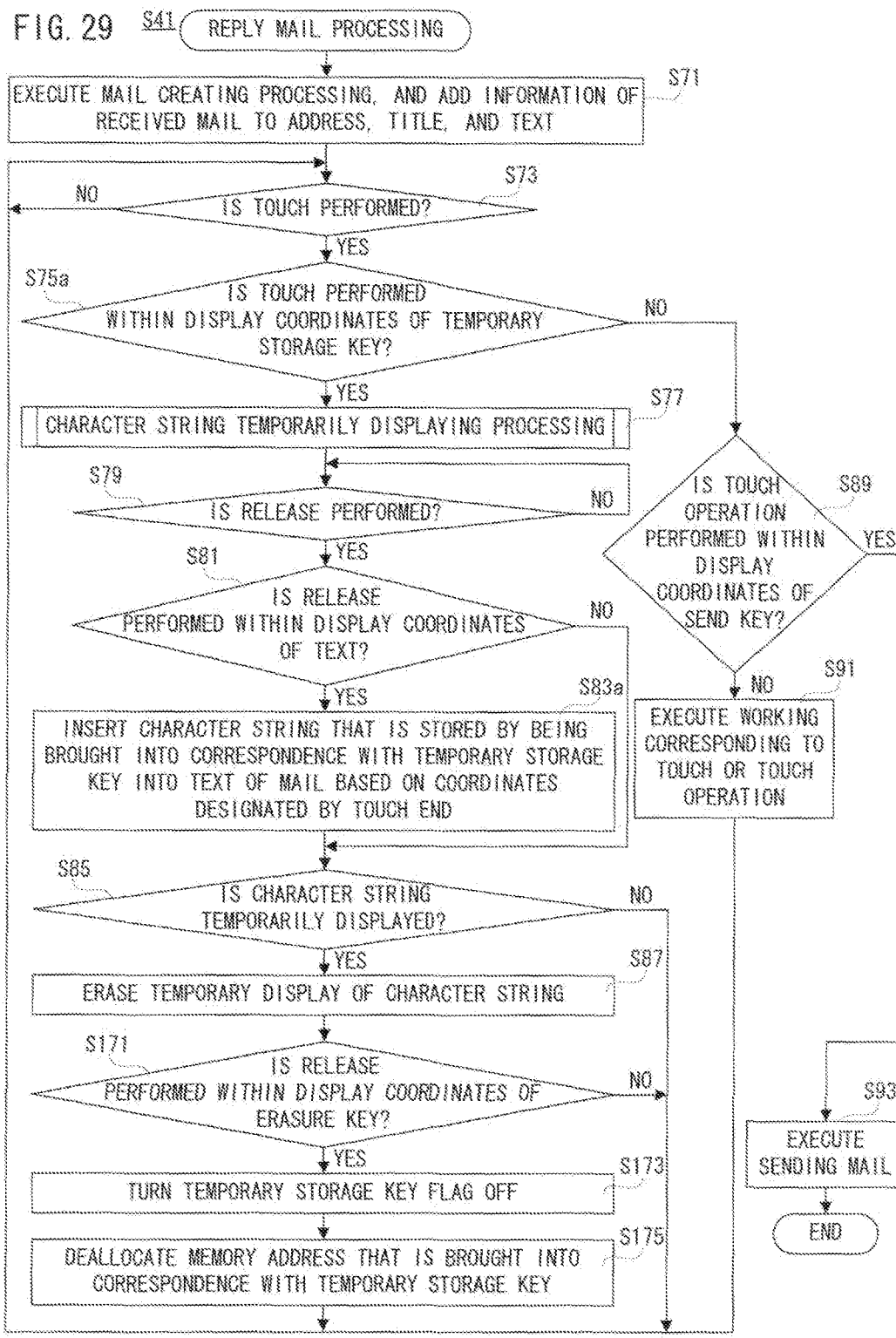
FIG. 29 is an illustrative view showing a reply mail processing program to be executed by the CPU of the mobile terminal in FIG. 1 of the invention of the second embodiment.

The CPU 20 of the second embodiment executes tasks including the entire processing shown in FIG. 13, the received mail processing shown in FIG. 14, the character string selecting processing shown in FIG. 15 and the character string temporarily displaying processing shown in FIG. 17 of the first embodiment in parallel, and executes tasks including temporary storage key creating processing shown in FIG. 28 and reply mail processing shown in FIG. 29 in parallel. Here, in the second embodiment, detailed explanations of the entire processing shown in FIG. 13, the received mail processing shown in FIG. 14, the character string selecting processing shown in FIG. 15 and the character string temporarily displaying processing shown in FIG. 17 are omitted.

FIG. 28 is a flowchart showing the temporary storage key creating processing. Referring to FIG. 28, in a step S141, the create key 170 and the erase key 172 are displayed. That is, as shown in the display example in FIG. 18(A), the create key 170 and the erase key 172 are displayed on the LCD monitor 32. Succeedingly, in a step S143, the temporary storage key 174 corresponding to the temporary storage key flag 102g that is in the on state is displayed. If the temporary storage key 1 flag 116 is in the on state, the temporary storage key 174 is displayed on the LCD monitor 32. Furthermore, if the temporary storage key 1 flag 118 is in the on state, a new temporary storage key is displayed on the LCD monitor 32 in addition to the temporary storage key 174.

Successively, in a step S145, it is determined whether or not a touch is performed. If "NO" in the step S145, that is, if a touch is not performed, the determination in the step S145 is repeated. On the other hand, if "YES" in the step S145, that is, if a touch is performed, it is determined whether or not the touch is performed within the display coordinates of the create key 170 in a step S147. That is, it is determined whether or not a touch start and a touch end are designated within the display coordinates of the create key 170. If "NO" in the step S147, that is, if a touch operation is not performed within the display coordinates of the create key 170, the process proceeds to a step S153. On the other hand, if "YES" in the step S147, out of the temporary storage key flags in the temporary storage key flag 102g that are in the off state, the temporary storage key flag to which the minimum value is assigned is set to the on state in a step S149. That is, if all the flags included in the temporary storage key flag 102g, such as a temporary storage key 1 flag 116, a temporary storage key 2 flag 118, . . . etc. are in the off state, the temporary storage key 1 flag 116 is set to the on state. Furthermore, if the temporary storage key 1 flag 116 is in the on state, the temporary storage key 2 flag 118 is set to the on state. Here, the CPU 20 executing the processing in the step S149 functions a design adder.

Successively, in a step S151, a memory address is brought into correspondence with the temporary storage key. If the temporary storage key 1 flag 116 is newly set to the on state, the memory address of the temporary storage data 102e is brought into correspondence with the temporary storage key 174 corresponding to the temporary storage key 1 flag 116. Here, the memory address 0X8000 shown in FIG. 12(C) is stored as corresponding memory address data 194c.

Then, in a step S153, it is determined whether or not an operation of ending the screen display is performed. If "NO" in the step S153, the process returns to the step S143 while if "YES", that is, the menu key 22b is operated, the temporary storage key creating processing is ended.

FIG. 29 is a flowchart showing the reply mail processing in the second embodiment. Furthermore, in the reply mail processing in the second embodiment, processing in the steps S71 to S73, steps S77 to S81, and the steps S85 to S93 are the same as those in the first embodiment, and therefore, the detailed explanations therefor are omitted. Furthermore, in steps S75a and S83a, the character input key is exchanged with temporary storage key 174, and the working in each of the processing is the same as that in the first embodiment.

Referring to FIG. 29, it is determined whether or not a release is performed within the display coordinates of the erase key 172 in a step S171. That is, it is determined whether or not the touch end designated by a release is within the display coordinates of the erase key 172. If "NO" in the step S171, that is, if a release is not performed within the display coordinates of the erase key 172, the process returns to the step S73. On the other hand, if "YES" in the step S171, the temporary storage key flag is turned off in a step S173. If the temporary storage key 174 is erased, the temporary storage key 1 flag 116 is set to the off state.

Successively, in a step S175, the memory address that is brought into correspondence with the temporary storage key 174 is deallocated. For example, the NULL data is stored as memory address data 194c. Then, after completion of the step S175, the process returns to the step S73. That is, the CPU 20 executing the processing in the steps S173 and S175 functions as a design eraser.

Here, the create key 170, the erase key 172 and the temporary storage key 174 can be displayed in other functions without being restricted to the mail function. Referring to FIG. 30, for example, in the browser function as well, the erase key 172 and the temporary storage key 174 are displayed. Here, in the function displaying area 56, an image of a map search site displayed by a browser function is displayed, and a map 86 is also displayed.

Figure 31:
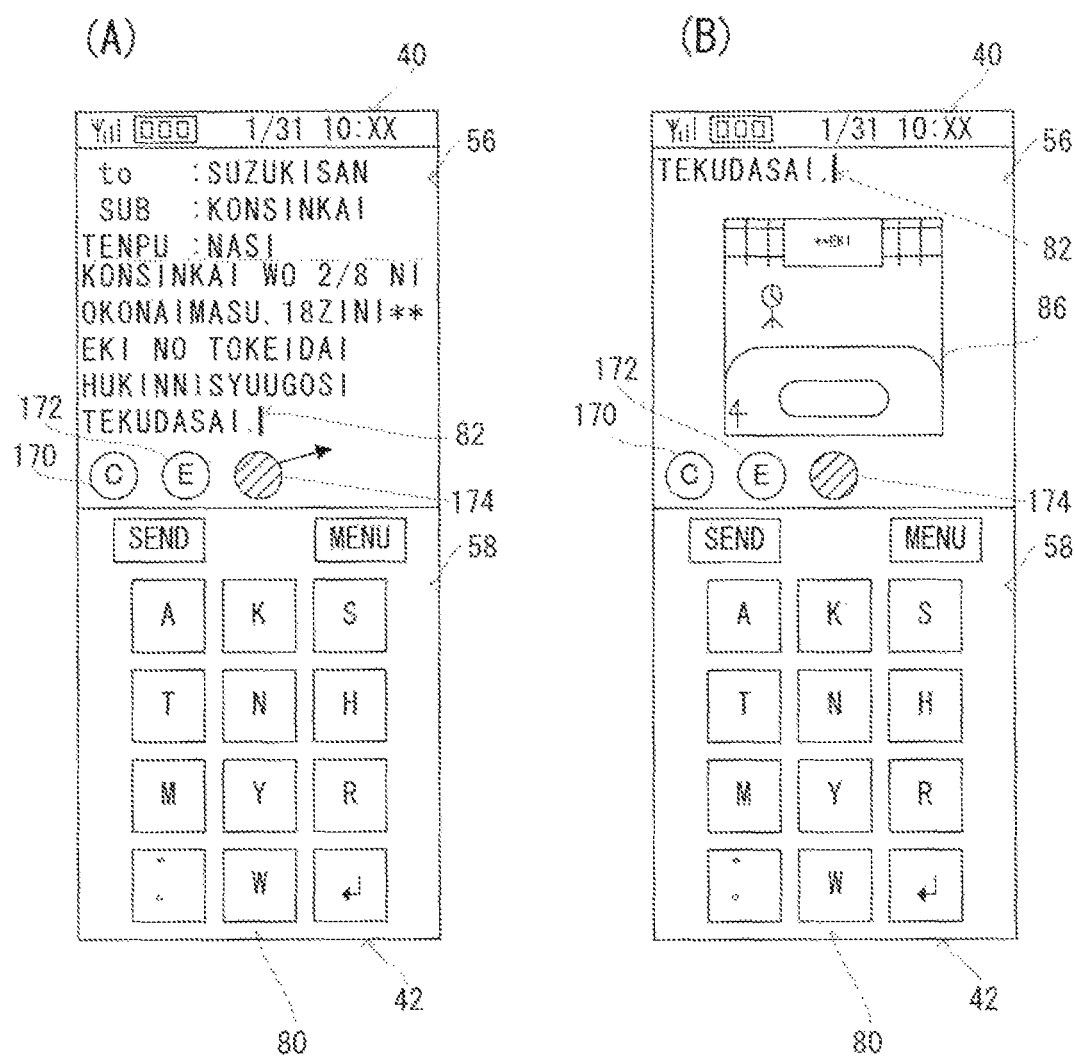
FIG. 31 is an illustrative view showing a display example of a new mail creation screen in the mail function of the mobile terminal shown in FIG. 1.

When a touch start is designated within the display coordinates of the map 86, and a touch end is designated within the display coordinates of the temporary storage key 174, the image data of the map 86 is temporarily stored. That is, if a touch and slide operation is performed from the display coordinates of the map 86 to the display coordinates of the temporary storage key 174, the image data of the map 86 is temporarily stored. Referring to FIG. 31(A), in the function displaying area 56, a text of a new mail is displayed, and the create key 170, the erase key 172 and the temporary storage key 174 are displayed together therewith. Then, when a touch start is designated within the display coordinates of the temporary storage key 174, and a touch end is designated within the display coordinates of the text of the new mail, the image data of the map 86 temporarily stored is displayed as shown in FIG. 31(B). That is, the image data of the map 86 temporarily stored is attached to the new mail.

Additionally, in the second embodiment as well, the character string data may be temporarily stored by being brought into correspondence with the character input key. Furthermore, if two or more temporary storage keys 174 are displayed, when a touch and slide operation is performed from one temporary storage key 174 to another temporary storage key 174, data stored by being brought into correspondence with the one temporary storage key 174 may be stored in the memory area indicated by the memory address corresponding to the other temporary storage key 174. Here, the CPU 20 executing the processing in the steps S25, S27, S31, S75, S79, S81 or S85 functions as a position specifier.

As understood from the above description, the user can arbitrarily create the key for temporary storage. Then, similar to the first embodiment, the mobile terminal 10 can temporarily store the character string, and insert it. In addition, in other functions such as a browser function, etc., image data, etc. temporarily stored can be inserted into the text of the new mail.

Thus, the user can temporarily store the selected character string and image by utilizing the touch panel input device 24, and can easily insert the character string and the image that are temporarily stored.

Additionally, in this embodiment, a selected character string in the received mail is temporarily stored, but a character string may temporarily be stored from a text of a new mail, a reply mail and a sent mail. In addition, without being restricted to the mail function, in other functions, such as a schedule function, a new address book registering function, etc., character string data and image data are temporarily stored, and the character string data and the image data that are temporarily stored may be inserted.

Furthermore, in the first embodiment and the second embodiment, a touch start or a touch end is detected by the display device with the touch panel, but a touch start or a touch end may be detected by the "system LCD with embedded optical sensors", etc. having the touch panel function.

In addition, a PHS system may be adopted as the communication system of the mobile terminal 10 without being restricted to the CDMA system, the W-CDMA system, and the TDMA system. Furthermore, the present invention may be applied to a handheld terminal, such as PDA (Personal Digital Assistant), etc. without being restricted to the mobile terminal 10.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mobile terminal comprising:
   a touch-panel display; and
   one or more controllers that
      display text in a first area on the touch-panel display, while displaying a virtual keyboard in a second area on the touch-panel display, wherein the virtual keyboard comprises a plurality of character keys,
      detect a selection operation that selects a character string at a first position within the displayed text,
      after detecting the selection operation, detect a slide operation from the first position to a second position corresponding to one of the plurality of character keys in the virtual keyboard,
      store the character string in association with the one character key, the character string being displayed in the first area and not being displayed on the one character key, and,
      while the character string is stored in association with the one character key,
         detect a touch operation on the one character key, wherein the touch operation comprises a touch on the touch-panel display,
         if a duration of the touch is less than a predetermined time period, insert the character corresponding to the one character key into the first area on the touch-panel display, and,
         if the duration of the touch is greater than the predetermined time period, display a temporary window comprising the character string, wherein the temporary window comprises an input for erasing the association between the character string and the one character key.

2. The mobile terminal of claim 1, wherein the touch operation further comprises a release, and wherein, when the release is performed while the temporary window is displayed, display of the temporary window is ended.

3. The mobile terminal of claim 1, wherein the touch operation further comprises a release, and wherein, when the release is performed at a third position within the first area on the touch-panel display, the character string is inserted within the first area at a position corresponding to the third position.

4. The mobile terminal of claim 1, wherein the selection operation comprises a first touch operation to indicate a start position of the character string and a second touch operation to indicate an end position of the character string.

5. The mobile terminal of claim 1, wherein each of the plurality of character keys is displayed with an indication of its corresponding character, and wherein, while the character string is stored in association with the one character key, the one character key is visually distinguished from other ones of the plurality of character keys.

6. The mobile terminal of claim 5, wherein, while the character string is stored in association with the one character key, the one character key is displayed in a different color than the other ones of the plurality of character keys.

7. A method for controlling a mobile terminal having a touch-panel display, wherein the method comprises using at least one processor of the mobile terminal to:
display text in a first area on the touch-panel display, while displaying a virtual keyboard in a second area on the touch-panel display, wherein the virtual keyboard comprises a plurality of character keys,
detect a selection operation that selects a character string at a first position within the displayed text,
after detecting the selection operation, detect a slide operation from the first position to a second position corresponding to one of the plurality of character keys in the virtual keyboard,
store the character string in association with the one character key, the character string being displayed in the first area and not being displayed on the one character key, and,
while the character string is stored in association with the one character key,
detect a touch operation on the one character key, wherein the touch operation
comprises a touch on the touch-panel display,
if a duration of the touch is less than a predetermined time period, insert the character corresponding to the one character key into the first area on the touch-panel display, and,
if the duration of the touch is greater than the predetermined time period, display a temporary window comprising the character string, wherein the temporary window comprises an input for erasing the association between the character string and the one character key.

8. The method of claim 7, wherein the touch operation further comprises a release, and wherein the method further comprises, when the release is performed while the temporary window is displayed, ending display of the temporary window.

9. The method of claim 7, wherein the touch operation further comprises a release, and wherein the method further comprises, when the release is performed at a third position within the first area on the touch-panel display, inserting the character string within the first area at a position corresponding to the third position.

10. The method of claim 7, wherein the selection operation comprises a first touch operation to indicate a start position of the character string and a second touch operation to indicate an end position of the character string.

11. The method of claim 7, wherein each of the plurality of character keys is displayed with an indication of its corresponding character, and wherein, while the character string is stored in association with the one character key, the one character key is visually distinguished from other ones of the plurality of character keys.

12. The method of claim 11, wherein, while the character string is stored in association with the one character key, the one character key is displayed in a different color than the other ones of the plurality of character keys.

13. A non-transitory computer-readable medium having instructions stored thereon, wherein the instructions, when executed by a processor, cause the processor to:
Display text in a first area on the touch-panel display, while displaying a virtual keyboard in a second area on the touch-panel display, wherein the virtual keyboard comprises a plurality of character keys,
detect a selection operation that selects a character string at a first position within the displayed text,
after detecting the selection operation, detect a slide operation from the first position to a second position corresponding to one of the plurality of character keys in the virtual keyboard,
store the character string in association with the one character key, the character string being displayed in the first area and not being displayed on the one character key, and,
while the character string is stored in association with the one character key,
detect a touch operation on the one character key, wherein the touch operation comprises a touch on the touch-panel display,
if a duration of the touch is less than a predetermined time period, insert the character corresponding to the one character key into the first area on the touch-panel display, and,
if the duration of the touch is greater than the predetermined time period, display a temporary window comprising the character string, wherein the temporary window comprises an input for erasing the association between the character string and the one character key.

14. The non-transitory computer-readable medium of claim 13, wherein the touch operation further comprises a release, and wherein the instructions further cause the processor to, when the release is performed while the temporary window is displayed, end display of the temporary window.

15. The non-transitory computer-readable medium of claim 13, wherein the touch operation further comprises a release, and wherein the instructions further cause the processor to, when the release is performed at a third position within the first area on the touch-panel display, insert the character string within the first area at a position corresponding to the third position.

16. The non-transitory computer-readable medium of claim 13, wherein the selection operation comprises a first touch operation to indicate a start position of the character string and a second touch operation to indicate an end position of the character string.

17. The non-transitory computer-readable medium of claim 13, wherein each of the plurality of character keys is displayed with an indication of its corresponding character, and wherein, while the character string is stored in association with the one character key, the one character key is visually distinguished from other ones of the plurality of character keys.

* * * * *